United States Patent [19]
Togino et al.

[11] Patent Number: 5,734,505
[45] Date of Patent: Mar. 31, 1998

[54] VISUAL DISPLAY APPARATUS

[75] Inventors: Takayoshi Togino, Koganei; Seiichiro Tabata, Hino, both of Japan

[73] Assignee: Olympus Optical Co., Ltd., Tokyo, Japan

[21] Appl. No.: 451,014

[22] Filed: May 25, 1995

[30] Foreign Application Priority Data

| May 27, 1994 | [JP] | Japan | 6-115259 |
| Jun. 9, 1994 | [JP] | Japan | 6-127452 |
| Jun. 9, 1994 | [JP] | Japan | 6-127453 |

[51] Int. Cl.$^6$ ............................................. G02B 27/14
[52] U.S. Cl. ................................. 359/631; 359/633
[58] Field of Search .............................. 359/631, 630, 359/632, 633, 639, 640, 839, 850

[56] References Cited

U.S. PATENT DOCUMENTS

| Re. 27,356 | 5/1972 | La Russa . | |
| 3,549,803 | 12/1970 | Becht | 359/631 |
| 4,163,542 | 8/1979 | La Russa . | |
| 4,274,715 | 6/1981 | Reiner | 351/30 |
| 4,674,883 | 6/1987 | Baurschmidt | 356/381 |
| 4,799,765 | 1/1989 | Ferrer | 359/631 |
| 4,854,688 | 8/1989 | Hayford et al. | 359/641 |
| 4,859,031 | 8/1989 | Berman et al. . | |
| 4,874,214 | 10/1989 | Cheysson et al. . | |
| 5,050,962 | 9/1991 | Monnier et al. | 359/13 |
| 5,050,966 | 9/1991 | Berman | 359/38 |
| 5,206,746 | 4/1993 | Ooi et al. . | |
| 5,303,085 | 4/1994 | Rallison . | |
| 5,408,346 | 4/1995 | Trissel | 359/65 |
| 5,506,728 | 4/1996 | Edwards | 359/629 |
| 5,517,366 | 5/1996 | Togino | 359/850 |
| 5,552,922 | 9/1996 | Magarill | 359/850 |

FOREIGN PATENT DOCUMENTS

| 0 583 116 A2 | 2/1994 | European Pat. Off. . |
| 2178691 | 7/1990 | Japan . |

*Primary Examiner*—David C. Nelms
*Assistant Examiner*—Ricky Mack
*Attorney, Agent, or Firm*—Cushman, Darby & Cushman IP Group of Pillsbury, Madison & Sutro LLP

[57] ABSTRACT

A small-sized, lightweight and inexpensive visual display apparatus which enables observation of a full-color image at a wide field angle, which is clear and flat as far as the edges thereof, without using a costly element such as a polarizing element. The visual display apparatus has an image display device (4), and an ocular optical system for projecting an image formed by the image display device (4) and for leading the projected image to an observer's eyeball. The image display device (4) has a louver (10) for limiting the viewing angle. The ocular optical system has two semitransparent surfaces (2 and 3). The second semitransparent surface (3) is a curved surface which is concave toward the observer's eyeball side, so that light rays emanating from the image display device (4) first pass through the second semitransparent curved surface (3), and are reflected by the first semitransparent surface (2). The reflected light rays are further reflected by the second semitransparent curved surface (3), and then pass through the first semitransparent surface (2) to enter the observer's eyeball. Further, the two semitransparent surfaces (2 and 3) are disposed such that at least the first semitransparent surface (2) is decentered with respect to the observer's visual axis directed to see the center of the projected image.

40 Claims, 18 Drawing Sheets

VISUAL DISPLAY APPARATUS

BACKGROUND OF THE INVENTION

The present invention relates to a visual display apparatus. More particularly, the present invention relates to a portable head- or face-mounted visual display apparatus which is retained on the observer's head or face in actual use.

An ocular optical system which uses a semitransparent concave mirror and a semitransparent plane mirror to project an object surface in the distance has heretofore been known as U.S. Reissued Pat. No. 27,356. With this arrangement, the optical path from an image display device to an observer's eyeball can be shortened by repeated reflection of light rays, and it is possible to reduce the amount to which the visual display apparatus projects forwardly from the observer's head.

In the ocular optical system disclosed in U.S. Reissued Pat. No. 27,356, among light rays emanating from the image display device, undesired direct light which reaches the observer's eyeball without being reflected by either of the two semitransparent reflecting surfaces is more intense than light which is projected in the distance to form an enlarged image to be observed. Therefore, a device for cutting off the direct light is needed. In this prior art, a polarizing element is disposed to cut off the direct light. However, such a polarizing element is costly, and when it is intended to observe a full-color image, a polarizing plate and a wave plate, which have favorable wavelength characteristics, are needed. However, it is presently impossible to obtain a polarizing plate and a wave plate which exhibit satisfactory performance over a wide wavelength range.

U.S. Pat. No. 4,859,031 discloses an arrangement in which a cholesteric liquid crystal is used as a polarizing element. However, since the performance of the cholesteric liquid crystal is susceptible to temperature, it is difficult to obtain stable performance.

U.S. Pat. No. 4,163,542, proposed by the present applicant, discloses an arrangement in which a first semitransparent reflecting surface, which is disposed closer to an observer's eyeball, is tilted with respect to a visual axis, which is an observer's viewing direction, in order to direct undesired light reflected by a semitransparent reflecting surface to the outside of the visual field. In this prior art, however, a polarizing element is also used in the same way as in U.S. Pat. No. 4,859,031.

SUMMARY OF THE INVENTION

In view of the above-described problems of the prior art, an object of the present invention is to provide a small-sized, lightweight and inexpensive visual display apparatus which is suitable for a wide field angle, and which enables observation of a full-color image which is clear and flat as far as the edges thereof, without using a costly element such as a polarizing element.

To attain the above-described object, the present invention provides a visual display apparatus having an image display device for displaying an image, and an ocular optical system for projecting an image formed by the image display device and for leading the projected image to an observer's eyeball. The image display device has a device for limiting the viewing angle. The ocular optical system has at least two semitransparent surfaces, which are defined as first and second semitransparent surfaces in order from the observer's eyeball side. The second semitransparent surface is a curved surface which is concave toward the observer's eyeball side, so that light rays emanating from the image display device first pass through the second semitransparent curved surface, and are reflected by the first semitransparent surface, and the reflected light rays are further reflected by the second semitransparent curved surface, and then pass through the first semitransparent surface to enter the observer's eyeball. Further, the at least two semitransparent surfaces are disposed such that at least the first semitransparent surface is decentered with respect to the observer's visual axis directed to see the center of the projected image.

In this case, it is preferable that both the at least two semitransparent surfaces of the ocular optical system should be concave surfaces which are concave toward the observer's eyeball side.

It is also preferable that the at least two semitransparent surfaces of the ocular optical system should be decentered so that the surface separation increases in a direction in which the image display device is decentered with respect to the above-described visual axis.

The reason for adopting the above-described arrangements in the present invention and the functions thereof will be explained below.

For the convenience of description, the present invention will be explained below on the basis of the backward ray tracing carried out from the exit pupil position of the ocular optical system toward the object surface.

The point of the present invention is that light rays from the image display device are prevented from directly entering the observer's eyeball by decentration of an optical system.

Constituent elements which are important in the present invention will be explained below.

In the present invention, it is important to tilt the image display device so that an observation image projected in front of the observer as an enlarged image by the ocular optical system will not contain light rays from the image display device which pass through the ocular optical system without being reflected by any semitransparent surface thereof, thereby preventing such light rays from directly entering the observer's eyeball.

If the image display device is merely tilted, the observer may be unable to see the observation image. Therefore, it is important in order to project the observation image in front of the observer as an enlarged image that at least the first semitransparent surface should be decentered such that a line perpendicular to the image display device-side surface of the first semitransparent surface is rotated toward the image display device. That is, by tilting at least one semitransparent surface, the observation image is projected as an enlarged image in front of the observer by light rays reflected once by each of the two semitransparent surfaces.

An image display device, particularly a CRT, emits light rays from a displayed image in various directions such that the light rays diffuse from the image display surface. Therefore, the image display device should be provided with a device for limiting the light rays emitted from the image display device, thereby limiting the viewing angle. This is another important constituent element of the present invention.

In order to prevent light rays emitted from the image display device from directly entering the observer's eyeball without being reflected by either of the semitransparent surfaces, it is necessary to tilt the image display device so that light rays from the image display device are emitted only in a direction deviated from the position of the observer's eyeball. That is, when light from the image display device emanates in all directions as in the case of a diffusing surface, undesired direct light, which enters the observer's eyeball without being reflected by either of the two semitransparent surfaces, becomes unfavorably intense if there is no device for blocking the undesired direct light. As a result, it becomes impossible to view the normal observation image. Accordingly, it is necessary to use an image display device which is limited in the viewing angle.

An image display device limited in the viewing angle may be realized by a method in which light rays emitted from the image display device are limited by a louver or other optical element, or by using a liquid crystal display device (LCD) in which the illumination angle on the illuminating side thereof is limited by a concave mirror.

Further, it is preferable to form both the two semitransparent surfaces by using concave surfaces which are concave toward the observer's eyeball side. By directing the concave surfaces of the two semitransparent surfaces toward the observer's eyeball side, Petzval sum produced in the ocular optical system can be satisfactorily corrected. The details of this arrangement are described in U.S. patent application Ser. No. 08/326,951, filed by the present applicant.

Further, it is preferable to dispose the image display device in a direction in which the surface separation between the two decentered semitransparent surfaces increases with respect to the observer's visual axis directed to see the center of the image projected in front of the observer. By doing so, it is possible to minimize aberration produced by the decentered semitransparent surfaces.

Further, it is preferable that the reflecting surface-side of each of the at least two semitransparent surfaces should be disposed in a transparent substance having a refractive index of not less than 1.3, e.g., a plastic material, a glass material, etc. That is, it is important from the viewpoint of aberration correction to use the semitransparent reflecting surfaces as back-coated mirrors. It is particularly preferable to raise the refractive index of the substance disposed between the semitransparent surfaces because, by doing so, it is possible to minimize comatic aberration produced in the ocular optical system and to widen the field angle (Examples 7 to 10).

Further, it is preferable to form the semitransparent curved surfaces by using aspherical surfaces in which the curvature decreases (i.e., the radius of curvature increases) as the distance from the optical axis increases. By doing so, it is possible to correct spherical aberration even if the pupil diameter is increased, and it is also possible to observe an image which is not eclipsed throughout the field of view even if there is an error in disposition of the observer's eyeball (Example 7).

Next, it is important that the viewing angle that is limited by the viewing angle limiting device should be made larger than a predetermined value only in a direction in which the observer's eyeball is disposed with respect to the display surface of the image display device. That is, it is only necessary to limit light rays in a direction in which light rays would otherwise directly enter the observer's eyeball without being reflected by any semitransparent surface of the ocular optical system, and it is not particularly necessary to limit the viewing angle at the opposite side.

Further, it is important that the viewing angle to the visual axis limited by the above-described viewing angle limiting device should be not larger than the numerical values (degree) shown in the table below relative to the field angle and the F-number of the optical system.

TABLE

| F-number | Field angle (degree) | | |
|---|---|---|---|
| | 15 | 30 | 40 |
| 14 | 25 | 30 | 35 |
| 7 | 30 | 35 | 40 |
| 4 | 35 | 40 | 45 |
| 3 | 40 | 45 | 50 |

The field angle in the table is the angle in the direction of decentration of the semitransparent surfaces and the image display device.

The visual display apparatus of the present invention may be considered as follows:

In the case of using two semitransparent surfaces as in the present invention, if a concentric optical system is formed, the entrance pupil position is in the vicinity of the center of curvature of the two semitransparent surfaces, as described in U.S. patent application Ser. No. 08/326,951, which is a prior application filed by the present inventor.

In the present invention, the image display device is tilted with respect to an axial principal ray which emanates from the center of the image display device, and which reaches the center of the pupil of the observer's eyeball so that an observation image projected in front of the observer as an enlarged image by the ocular optical system will not contain direct light from the image display device which passes through the ocular optical system without being reflected by any semitransparent surface thereof, thereby preventing the direct light from directly entering the observer's eyeball.

Further, it is important in order to project the observation image in front of the observer as an enlarged image so that at least the first semitransparent surface of the at least two semitransparent surfaces should be decentered such that a line perpendicular to the image display device-side surface of the first semitransparent surface is rotated toward the image display device with respect to the observer's visual axis directed to see the center of the projected image. That is, by tilting at least one semitransparent surface, only the observation image is projected as an enlarged image in front of the observer by leading only light rays reflected once by each of the two semitransparent surfaces to the observer's eyeball.

As has been described above, in order to prevent light rays emitted from the image display device from directly entering the observer's eyeball without being reflected by either of the semitransparent surfaces, it is necessary to tilt the image display device so that light rays from the image display device are emitted only in a direction deviated from the position of the observer's eyeball. That is, it is important to dispose the image display device so that the observation image projected in front of the observer is not disturbed by direct light from the image display device which would otherwise reach the observer's eyeball without being reflected by either of the semitransparent surfaces.

Further, it is preferable to tilt the display surface of the image display device with respect to the visual axis. By doing so, direct light from the image display device, which would otherwise enter the observer's eyeball without being reflected by either of the semitransparent surfaces, can be readily directed to the outside of the field of view.

It is even more preferable to tilt the display surface of the image display device 45° or more with respect to the visual axis. By doing so, direct light from the image display device, which would otherwise enter the observer's eyeball without being reflected by either of the semitransparent surfaces, can be deviated from the observer's pupil position to a considerable extent.

Further, it is preferable to tilt both the semitransparent surfaces with respect to the visual axis. By doing so, it is possible to minimize coma and astigmatism produced by at least the decentered second semitransparent concave mirror.

Further, it is preferable to form both the semitransparent surfaces by using concave surfaces which are concave toward the observer's eyeball side. By directing the concave surfaces of the two semitransparent surfaces toward the observer's eyeball side, it becomes possible to satisfactorily correct the Petzval sum produced in the ocular optical system. The details of this arrangement are described in Japanese Patent Application No. 05-264828, filed by the present applicant.

Next, tilting of the semitransparent surfaces will be explained. In general, when light rays are bent by a refracting surface of a lens, chromatic aberration is produced in theory. This is the same as the phenomenon in which, when light rays passing through a slit are incident on a prism, the light rays are observed as a rainbow of seven colors. This is caused by the dispersion of a glass material constituting the prism. This phenomenon occurs in any kind of transparent medium such as a glass or plastic material.

In the ocular optical system of the present invention, since the image display device is tilted at a large angle with respect to the visual axis, dispersion by the above medium occurs to a considerable extent in the form of aberration, causing the contrast of the observation image to be lowered and also the resolution to be extremely reduced. Therefore, in the present invention, at least two reflecting surfaces are incorporated into the ocular optical system as a device for refracting light rays, thereby solving the above-described problems. The reason why the problems can be solved is that reflecting surfaces cause no dispersion due to different wavelengths in theory.

In a case where the reflecting surfaces are formed by using curved surfaces as described above, when light rays are obliquely incident on the curved surfaces, aberration which is not rotationally symmetric with respect to the visual axis is produced. With a view to minimizing the non-rotationally symmetric aberration, it is preferable to dispose the at least two semitransparent surfaces at a tilt with respect to the visual axis so as to minimize the tilt of light rays when reflected by the two semitransparent surfaces.

Further, the at least two semitransparent surfaces are preferably disposed so as to diverge in the shape of a "V" in a direction in which the image display device lies with respect to light rays traveling backward on the visual axis, i.e., in a direction in which backward traveling light rays are bent. By doing so, it is possible to dispersedly dispose refractive power which acts on light rays when reflected at each semitransparent surface. Accordingly, it becomes possible to minimize aberration which is not rotationally symmetric with respect to the visual axis, and hence possible to view an observation image of high resolution which is clear as far as the edges thereof.

The tilt angle of the image display device and the tilt angle of the first semitransparent surface will be explained below. It is important to dispose the image display device and the first semitransparent surface so that the relationship between the tilt angle $\theta_1$ of the first semitransparent surface and the tilt angle $\theta_i$ of the image display device with respect to the visual axis (see FIG. 1) satisfies the following condition:

$$0.1 < \theta_1/\theta_i < 0.9 \qquad (1)$$

If $\theta_1/\theta_i$ is not larger than the lower limit of the condition (1), i.e., 0.1, the load imposed on the second semitransparent surface for bending light rays increases. Since the second semitransparent surface is formed by using a concave surface, aberration which is not rotationally symmetric with respect to the visual axis occurs, and it is difficult to correct the aberration by another surface. If the $\theta_1/\theta_i$ is not smaller than the upper limit, i.e., 0.9, the light ray bending power of the first semitransparent surface becomes excessively strong, and it also becomes impossible to correct aberration which is not rotationally symmetric with respect to the visual axis by another surface.

Further, it is preferable to dispose the image display device and the first semitransparent surface so that the relationship between the tilt angle $\theta_1$ of the first semitransparent surface and the tilt angle $\theta_i$ of the image display device with respect to the visual axis satisfies the following condition:

$$0.2 < \theta_1/\theta_i < 0.7 \qquad (2)$$

The conditional (2) particularly necessary to satisfy when it is desired to obtain an observation image of high resolution which is clear as far as the edges thereof at a field angle exceeding 20°. The upper and lower limits of the condition (2) have been set for the same reason as in the case of the condition (1).

When a wider field angle of 30° or more and a higher resolution are needed, it is preferable to satisfy the following condition:

$$0.3 < \theta_1/\theta_i < 0.6 \qquad (3)$$

Further, it is preferable that the reflecting surface-side of each of the at least two semitransparent surfaces should be disposed in a transparent substance having a refractive index of not less than 1.3, e.g., a plastic material, a glass material, etc. That is, it is important from the viewpoint of aberration correction to use the semitransparent reflecting surfaces as back-coated mirrors. It is particularly preferable to raise the refractive index of the substance disposed between the semitransparent surfaces because, by doing so, it is possible to minimize comatic aberration produced in the ocular optical system and to widen the field angle.

Further, it is preferable to form the semitransparent curved surfaces by using aspherical surfaces in which the curvature decreases (i.e., the radius of curvature increases) as the distance from the optical axis increases. By doing so, it is possible to correct spherical aberration even if the pupil diameter is increased, and it is also possible to observe an image which is not eclipsed throughout the field of view even if there is an error in disposition of the observer's eyeball.

It should be noted that the visual display apparatus of the present invention becomes more observable by having a device for determining the relative position thereof with respect to the observer's eyeball. The reason for this is that the exit pupil diameter of the optical system in the apparatus is limited, although it is large. Therefore, unlike the TV screen, the image displayed by this apparatus cannot necessarily be observed from any direction. It is desirable to provide the visual display apparatus of the present invention with a device for supporting it with respect to the observer's head or face.

In addition, the visual display apparatus of the present invention may be arranged as follow: At least two ocular optical systems which are formed from two decentered semitransparent surfaces as described above are provided so as to share an exit pupil position with each other, and image display devices which are associated with these ocular optical systems are arranged to display different images. Moreover, these displayed images are presented to the observer's eyeballs as images which are spatially combined together. Thus, it is possible to display a composite image at a wide field angle of 60° or more with the joint of the image display devices made inconspicuous.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Some examples of the visual display apparatus according to the present invention will be described below with reference to the accompanying drawings.

Example 1

Figure 1:
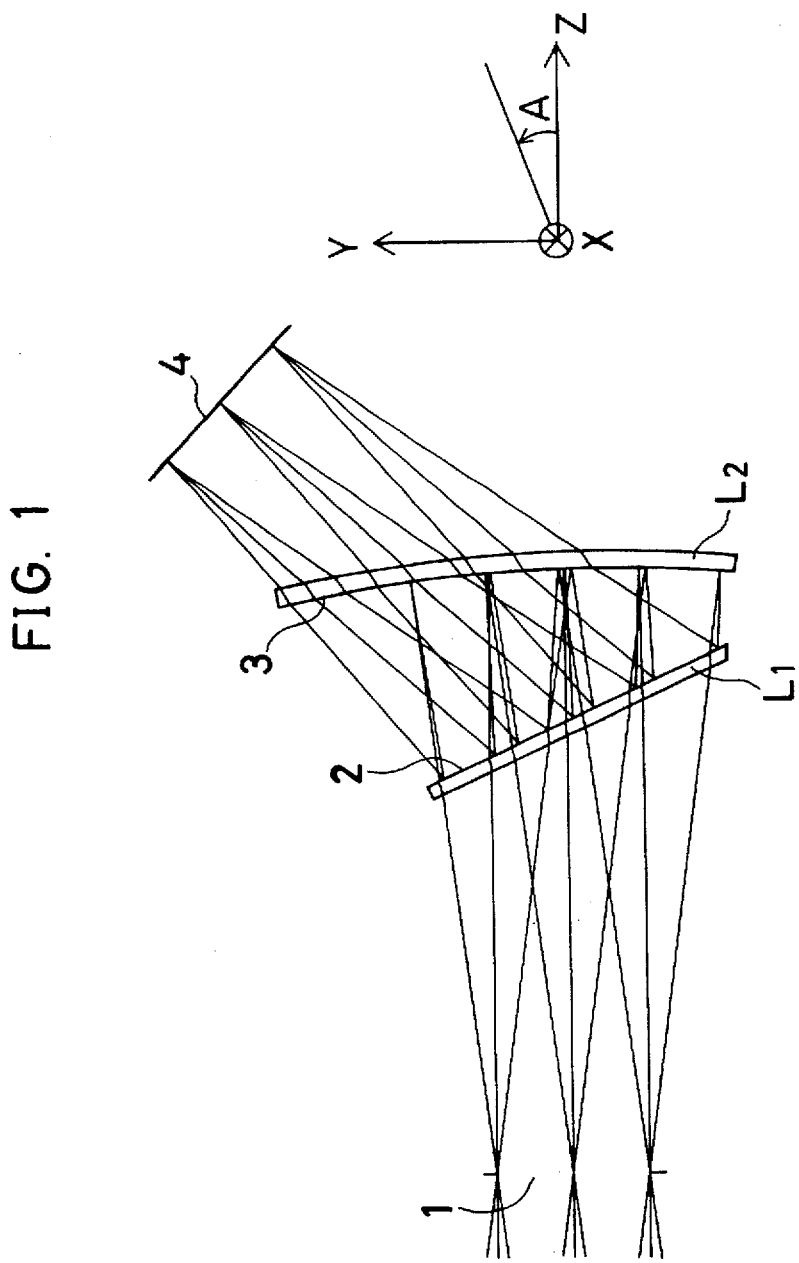
FIG. 1 shows the arrangement of an ocular optical system in Example 1 of the visual display apparatus according to the present invention.

Example 1 of the present invention will be explained below with reference to FIG. 1. In the figure, reference numeral 1 denotes a stop position (exit pupil position), 2 a first semitransparent mirror, 3 a second semitransparent mirror, and 4 an image surface (actually, an image display device, e.g., an LCD). In backward ray tracing, light emanating from the stop position 1 first passes through the first semitransparent mirror 2, and is reflected by the second semitransparent mirror 3. The reflected light is further reflected by the first semitransparent mirror 2, and then passes through the second semitransparent mirror 3 to reach the image surface 4.

In this example, the first semitransparent mirror 2 is provided on the image-side surface of a lens $L_1$, and the second semitransparent mirror 3 on the stop side-surface of a lens $L_2$. Thus, the first and second semitransparent mirrors 2 and 3 are used as surface-coated mirrors.

Numerical data in this example will be shown later. In this example, the focal length F is 40 millimeters. It should, however, be noted that any desired focal length can be obtained by coefficient-multiplying the whole data in this example.

It should be noted that, in the numerical data, reference symbol nd denotes the refractive index of each lens, and γd denotes the Abbe's number of each lens (the same shall apply hereinafter). Regarding the decentration (eccentricity) of each surface, the tilt angle (inclination angle) A of each surface is given by the angle of the center axis of the surface with respect to the visual axis (Z-axis) passing through the center of the stop position 1 as shown in FIG. 1, and decentering Y of each surface is given by the distance by which the center of the surface shifts from the visual axis (Z-axis) passing through the center of the stop position 1 in a direction (Y-axis direction) perpendicular to the Z-axis. The surface separation between each pair of adjacent surfaces is given by the distance between the adjacent surfaces along the visual axis before decentration.

In this example, the field angle is 20° (in the XZ-plane), and the focal length F is 40 millimeters. F-number is 4.00.

Example 2

Figure 2:
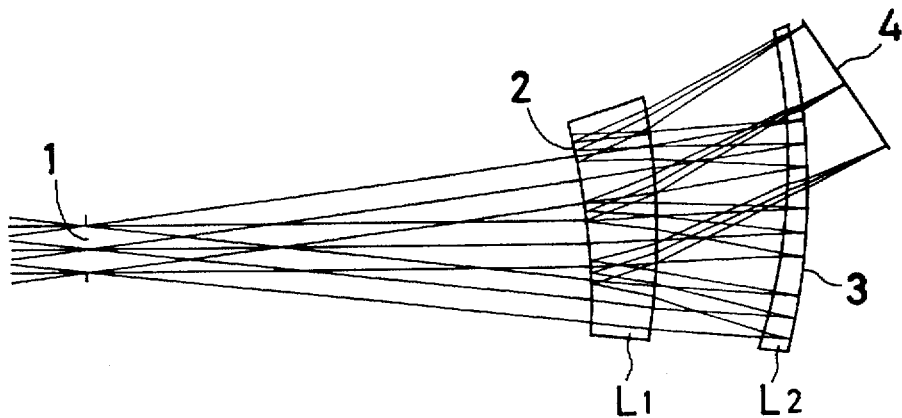
FIG. 2 shows the arrangement of an ocular optical system in Example 2 of the visual display apparatus according to the present invention.

FIG. 2 shows the optical arrangement of Example 2. In the figure, reference numeral 1 denotes a stop position (exit pupil position), 2 a first semitransparent mirror, 3 a second semitransparent mirror, and 4 an image surface (actually, an image display device, e.g., an LCD). In backward ray tracing, light emanating from the stop position 1 first passes through the first semitransparent mirror 2, and is reflected by the second semitransparent mirror 3. The reflected light is further reflected by the first semitransparent mirror 2, and then passes through the second semitransparent mirror 3 to reach the image surface 4.

In this example, the first semitransparent mirror 2 is provided on the stop-side surface of a lens $L_1$, and the second semitransparent mirror 3 on the image-side surface of a lens $L_2$. Thus, the first and second semitransparent mirrors 2 and 3 are used as back-coated mirrors.

In this example, the field angle is 20° (in the XZ-plane), and the focal length F is 40 millimeters. F-number is 13.33. Numerical data in this example will be shown later.

Example 3

Figure 3:
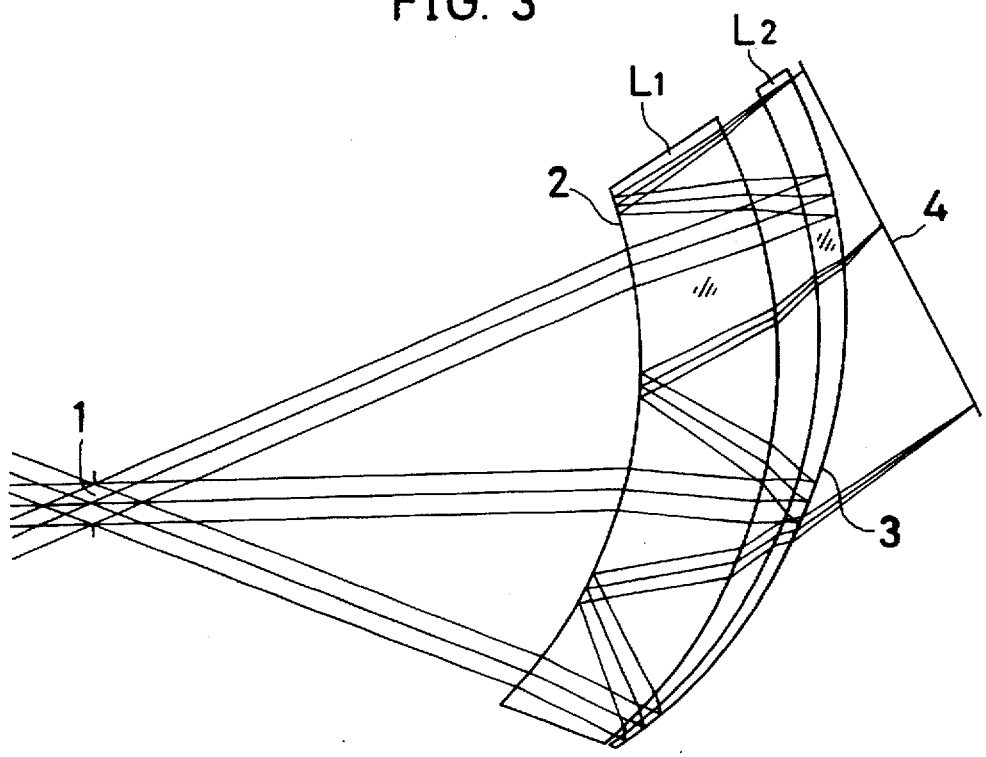
FIG. 3 shows the arrangement of an ocular optical system in Example 3 of the visual display apparatus according to the present invention.

FIG. 3 shows the optical arrangement of Example 3. This example is basically the same as Example 2. In this example, the field angle is 60° (in the XZ-plane), and the focal length F is 40 millimeters. F-number is 13.33. Numerical data in this example will be shown later.

Example 4

Figure 4:
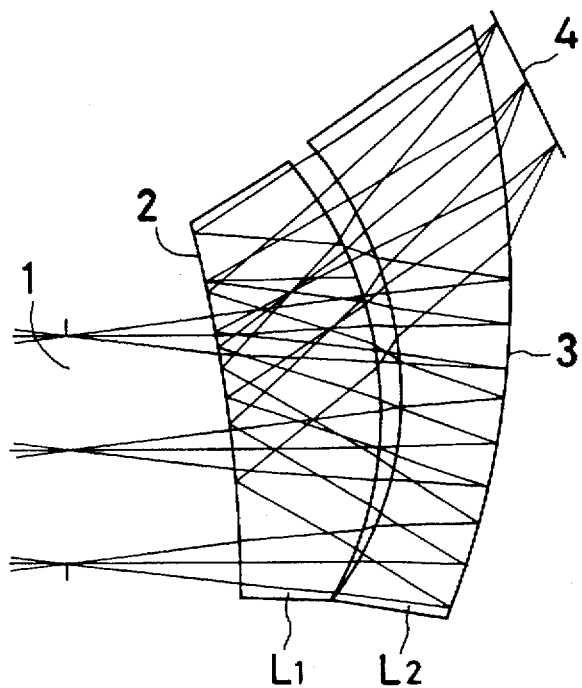
FIG. 4 shows the arrangement of an ocular optical system in Example 4 of the visual display apparatus according to the present invention.

FIG. 4 shows the optical arrangement of Example 4. This example is basically the same as Example 2. In this example, the field angle is 20° (in the XZ-plane), and the focal length F is 40 millimeters. F-number is 2.66. Numerical data in this example will be shown later.

Example 5

Figure 5:
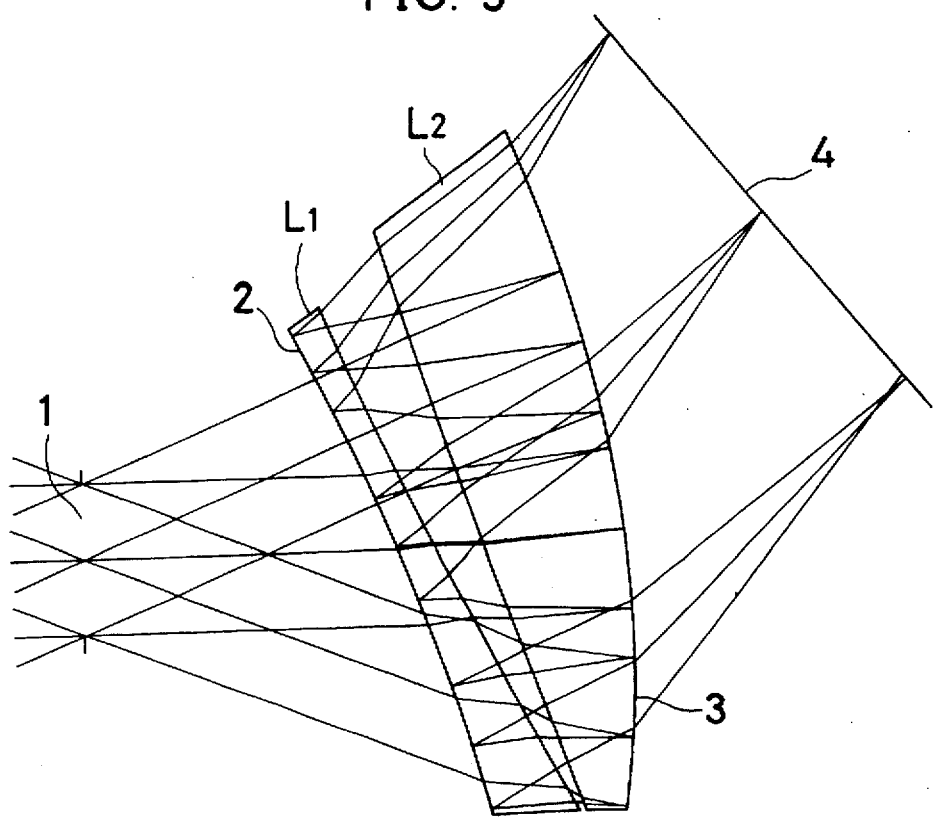
FIG. 5 shows the arrangement of an ocular optical system in Example 5 of the visual display apparatus according to the present invention.

FIG. 5 shows the optical arrangement of Example 5. This example is basically the same as Example 2. In this example, the field angle is 60° (in the XZ-plane), and the focal length F is 40 millimeters. F-number is 4.00. Numerical data in this example will be shown later.

Example 6

Figure 6:
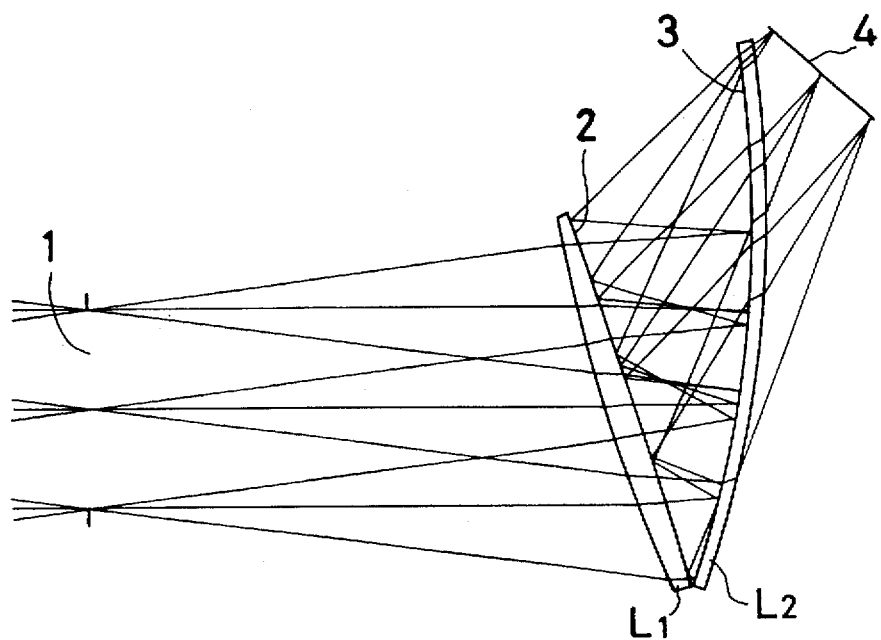
FIG. 6 shows the arrangement of an ocular optical system in Example 6 of the visual display apparatus according to the present invention.

FIG. 6 shows the optical arrangement of Example 6. This example is basically the same as Example 1. In this example, the field angle is 20° (in the XZ-plane), and the focal length F is 40 millimeters. F-number is 2.66. Numerical data in this example will be shown later.

Example 7

Figure 7:
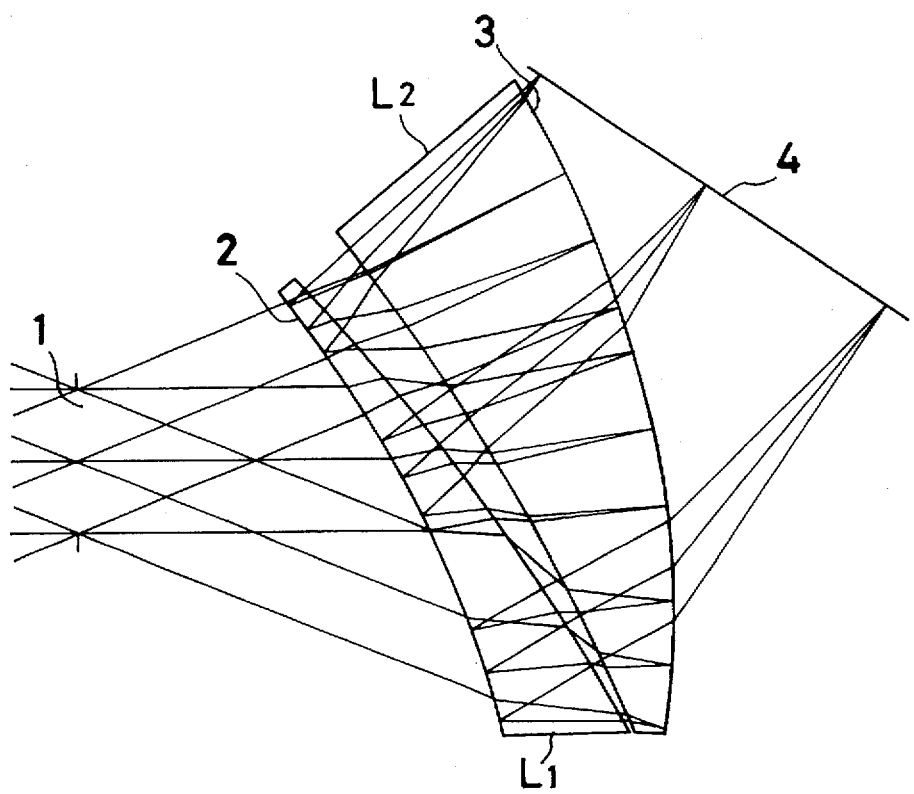
FIG. 7 shows the arrangement of an ocular optical system in Example 7 of the visual display apparatus according to the present invention.

FIG. 7 shows the optical arrangement of Example 7. This example is basically the same as Example 2. In this example, the surfaces of the lenses $L_1$ and $L_2$, on which the semitransparent mirrors 2 and 3 are to be provided, are formed into anamorphic-aspherical surfaces, thereby making even more effective aberration correction.

In this example, the field angle is 60° (in the XZ-plane), and the focal length F is 40 millimeters. F-number is 4.00. Numerical data in this example will be shown later.

It should be noted that, in the numerical data, the aspherical configuration of each surface may be expressed by $$Z = [(X^2/R_x) + (Y^2/R_y)]/[1 + \{1 - (1 + K_x)(X^2/R_x^2) -$$
$$(1 + K_y)(Y^2/R_y^2)\}^{1/2}] +$$
$$AR [(1 - AP)X^2 + (1 + AP)Y^2]^2 +$$
$$BR [(1 - BP)X^2 + (1 + BP)Y^2]^3$$

where $R_y$ is the paraxial curvature radius of each anamorphic-aspherical surface in the YZ-plane (the plane of the figure); $R_x$ is the paraxial curvature radius in the XZ-plane; $K_x$ is the conical coefficient in the X-direction; $K_y$ is the conical coefficient in the Y-direction; AR and BR are rotationally symmetric 4th- and 6th-order aspherical coefficients, respectively; and AP and BP are asymmetric 4th- and 6th-order aspherical coefficients, respectively.

It should be noted that higher-order aspherical coefficients are 0.

Example 8

Figure 8:
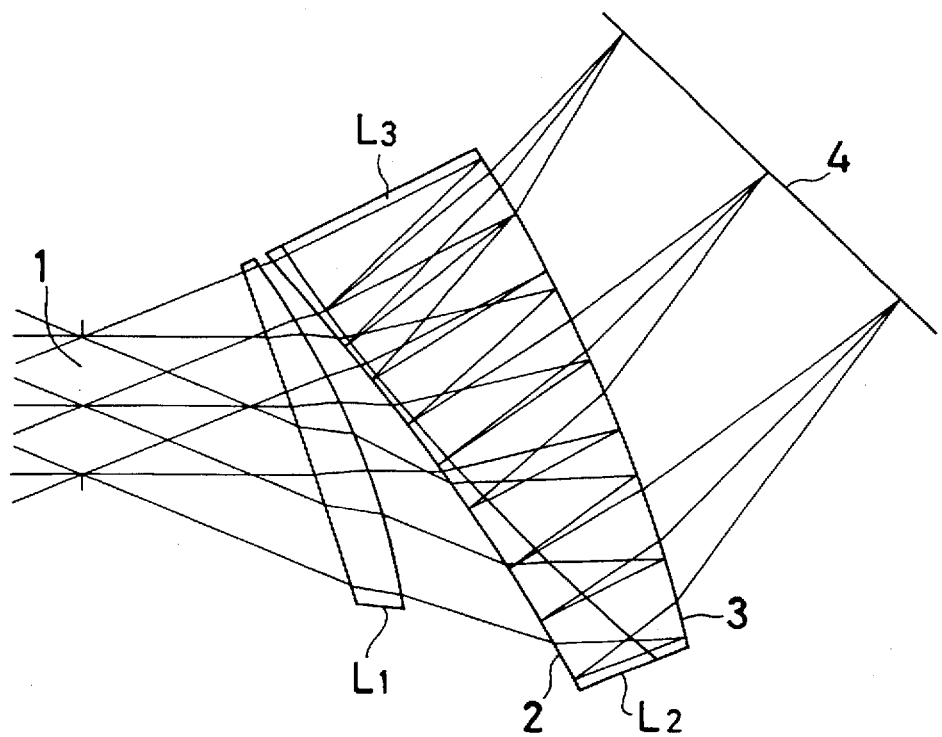
FIG. 8 shows the arrangement of an ocular optical system in Example 8 of the visual display apparatus according to the present invention.

FIG. 8 shows the optical arrangement of Example 8. In the figure, reference numeral 1 denotes a stop position (exit pupil position), 2 a first semitransparent mirror, 3 a second semitransparent mirror, and 4 an image surface (actually, an image display device, e.g., an LCD). In backward ray tracing, light emanating from the stop position 1 first passes through the first semitransparent mirror 2, and is reflected by the second semitransparent mirror 3. The reflected light is further reflected by the first semitransparent mirror 2, and then passes through the second semitransparent mirror 3 to reach the image surface 4.

In this example, three lenses $L_1$, $L_2$ and $L_3$ are disposed in the mentioned order from the stop side. Among the three lenses, the lenses $L_2$ and $L_3$ are cemented together. The first semitransparent mirror 2 is provided on the stop-side surface of the cemented lens, and the second semitransparent mirror 3 on the image-side surface of the cemented lens. Thus, the first and second semitransparent mirrors 2 and 3 are used as back-coated mirrors.

In this example, the field angle is 60° (in the XZ-plane), and the focal length F is 40 millimeters. F-number is 4.00. Numerical data in this example will be shown later.

Example 9

Figure 9:
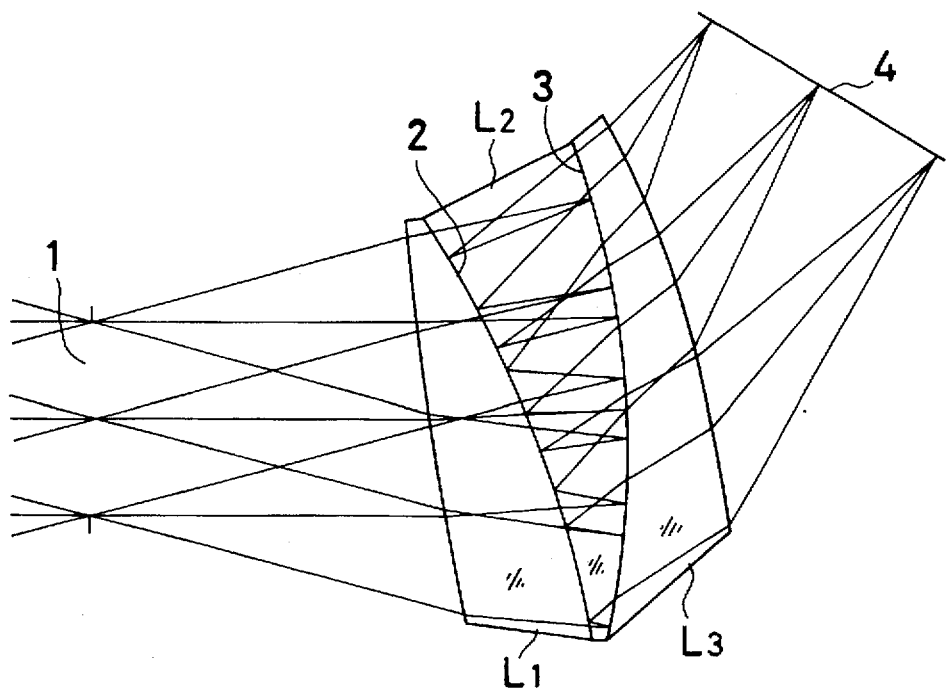
FIG. 9 shows the arrangement of an ocular optical system in Example 9 of the visual display apparatus according to the present invention.

FIG. 9 shows the optical arrangement of Example 9. In the figure, reference numeral 1 denotes a stop position (exit pupil position), 2 a first semitransparent mirror, 3 a second semitransparent mirror, and 4 an image surface (actually, an image display device, e.g., an LCD). In backward ray tracing, light emanating from the stop position 1 first passes through the first semitransparent mirror 2, and is reflected by the second semitransparent mirror 3. The reflected light is further reflected by the first semitransparent mirror 2, and then passes through the second semitransparent mirror 3 to reach the image surface 4.

In this example, three lenses $L_1$, $L_2$ and $L_3$ are disposed in the mentioned order from the stop side, and these three lenses are cemented together. The first semitransparent mirror 2 is provided on the cemented surface defined between the lenses $L_1$ and $L_2$, and the second semitransparent mirror 3 on the cemented surface defined between the lenses $L_2$ and $L_3$.

In this example, the field angle is 40° (in the XZ-plane), and the focal length F is 40 millimeters. F-number is 2.66. Numerical data in this example will be shown later.

Example 10

Figure 10:
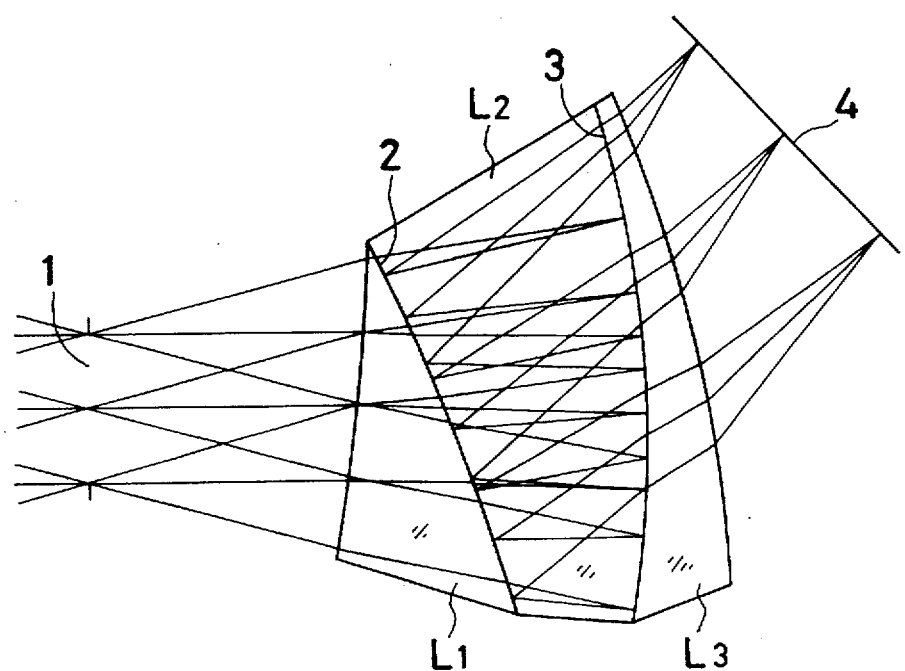
FIG. 10 shows the arrangement of an ocular optical system in Example 10 of the visual display apparatus according to the present invention.

FIG. 10 shows the optical arrangement of Example 10. This example is basically the same as Example 9. In this example, however, the cemented surface between the lenses $L_1$ and $L_2$, on which the first semitransparent mirror 2 is to be provided, is formed into an anamorphic-aspherical surface.

In this example, the field angle is 40° (in the XZ-plane), and the focal length F is 40 millimeters. F-number is 4.00. Numerical data in this example will be shown later. It should be noted that the notation of the anamorphic-aspherical surface in the numerical data is the same as in Example 7.

Example 11

Figure 11B:
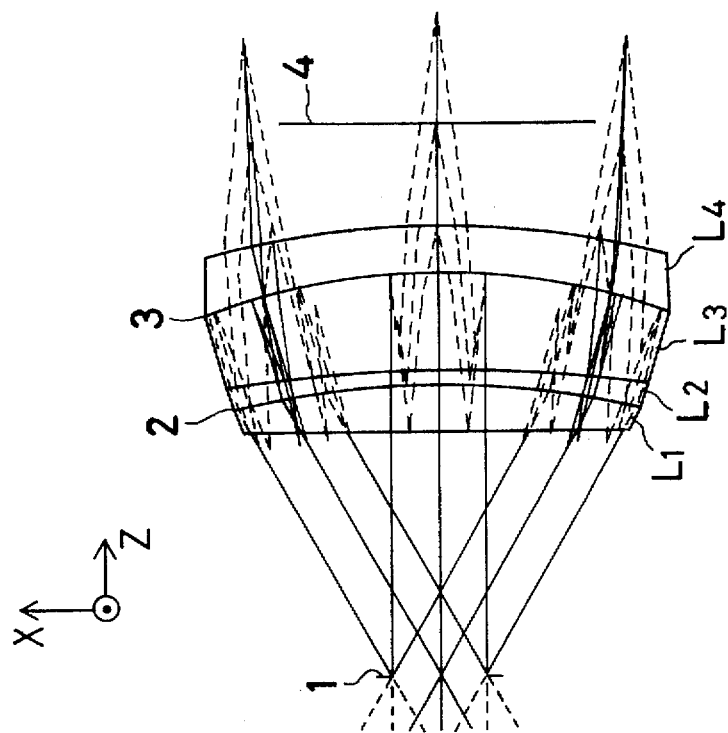
FIGS. 11(a) and 11(b) are sectional views showing the arrangement of an ocular optical system in Example 11 of the visual display apparatus according to the present invention.
Figure 11A:
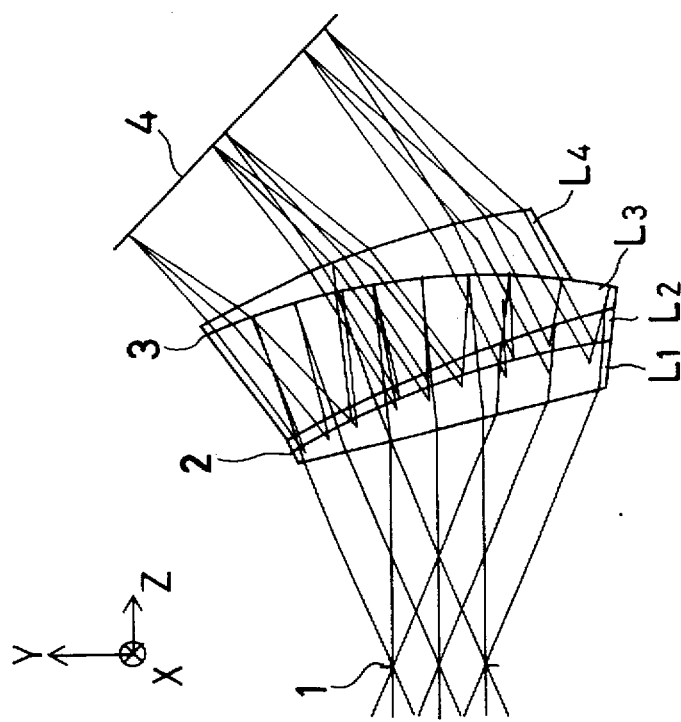

FIG. 11(a) is a sectional view of Example 11 taken along a plane (YZ-plane) in which the optical elements are decentered, and FIG. 11(b) is a sectional view of Example 11 taken along a plane (XZ-plane) perpendicular to the YZ-plane. In each of FIGS. 11(a) and 11(b), light rays which travel outside the section are also shown, being projected on the section, in addition to light rays within the section. In these figures, reference numeral 1 denotes a stop position (exit pupil position), 2 a first semitransparent mirror, 3 a second semitransparent mirror, and 4 an image surface (actually, an image display device, e.g., an LCD). In backward ray tracing, light emanating from the stop position 1 first passes through the first semitransparent mirror 2, and is reflected by the second semitransparent mirror 3. The reflected light is further reflected by the first semitransparent mirror 2, and then passes through the second semitransparent mirror 3 to reach the image surface 4.

In this example, four lenses $L_1$, $L_2$, $L_3$ and $L_4$ are disposed in the mentioned order from the stop side, and these four lenses are cemented together. The first semitransparent mirror 2 is provided on the cemented surface defined between the lenses $L_1$ and $L_2$, and the second semitransparent mirror 3 on the cemented surface defined between the lenses $L_3$ and $L_4$.

In this example, the field angle is 60° (in the XZ-plane), and the focal length F is 40 millimeters. F-number is 4.00. Numerical data in this example will be shown later.

Example 12

Figure 12:
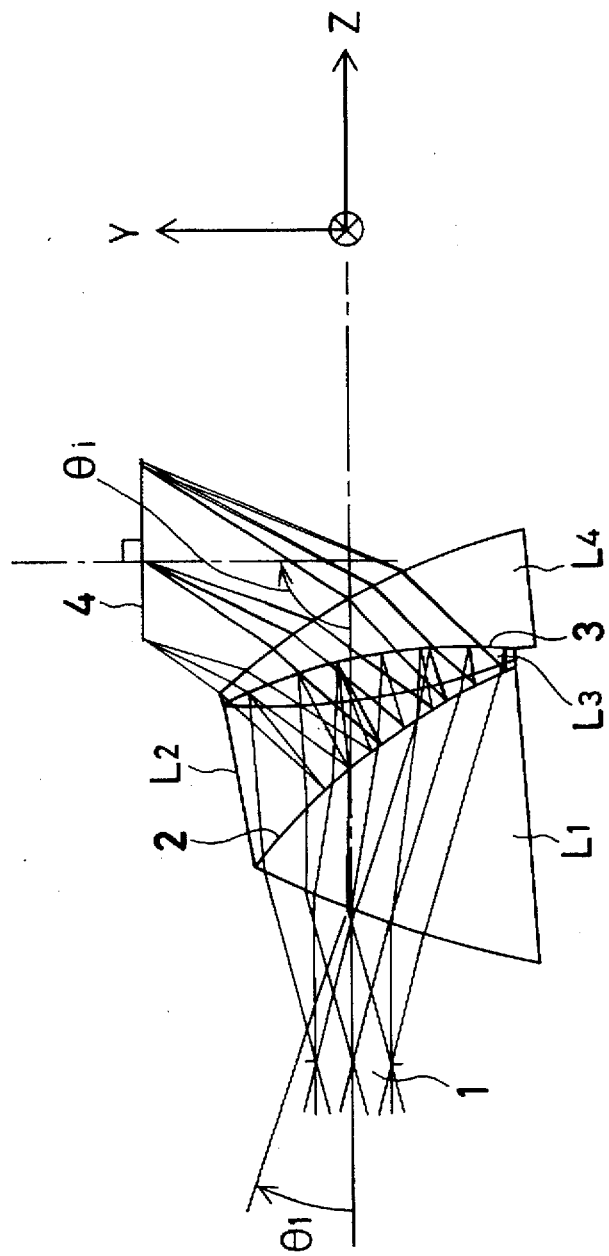
FIG. 12 shows the arrangement of an ocular optical system in Example 12 of the visual display apparatus according to the present invention.

Example 12 will be explained below with reference to FIG. 12. The figure shows an optical system for the observer's right eye. An optical system for the observer's left eye is also arranged in the same way. In the figure, reference numeral 1 denotes a stop position (exit pupil position), 2 a first semitransparent mirror, 3 a second semitransparent mirror, and 4 an image surface (actually, an image display device, e.g., an LCD). In backward ray tracing, light emanating from the stop position 1 first passes through the first semitransparent mirror 2, and is reflected by the second semitransparent mirror 3. The reflected light is further reflected by the first semitransparent mirror 2, and then passes through the second semitransparent mirror 3 to reach the image surface 4.

In this example, four lenses $L_1$, $L_2$, $L_3$ and $L_4$ are disposed in the mentioned order from the stop side, and these four lenses are cemented together. The first semitransparent mirror 2 is provided on the cemented surface defined between the first and second lenses $L_1$ and $L_2$, and the second semitransparent mirror 3 on the cemented surface defined between the third and fourth lenses $L_3$ and $L_4$.

Numerical data in this example will be shown later. In this example, the focal length F is 40 millimeters. It should, however, be noted that any desired focal length can be obtained by coefficient-multiplying the whole data in this example.

In this example, the field angle is 30° (in the YZ-plane), and the focal length F is 40 millimeters. F-number is 4.00.

Example 13

Figure 13:
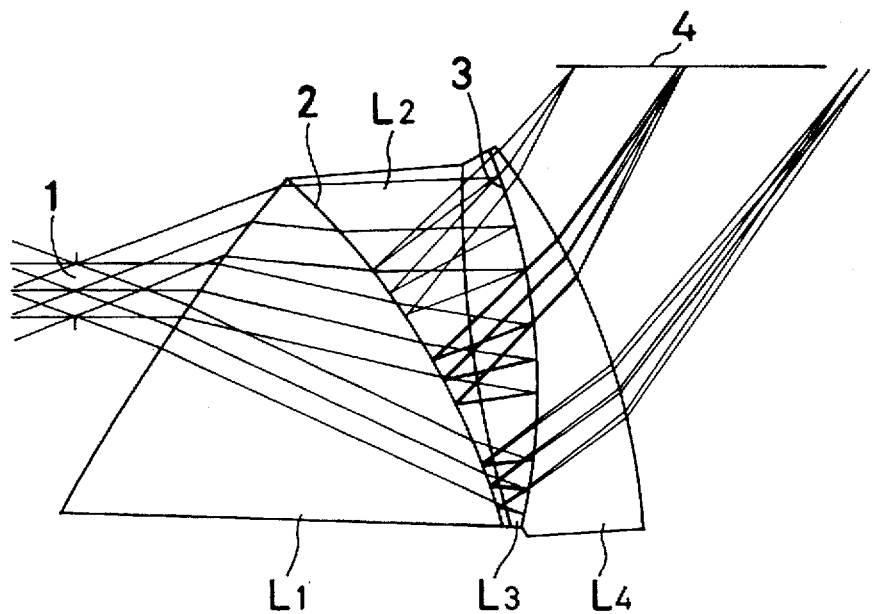
FIG. 13 shows the arrangement of an ocular optical system in Example 13 of the visual display apparatus according to the present invention.

FIG. 13 shows the optical arrangement of Example 13. This example is basically the same as Example 12. In this example, the field angle is 40° (in the YZ-plane), and the focal length F is 40 millimeters. F-number is 6.67. Numerical data in this example will be shown later.

Example 14

Figure 14:
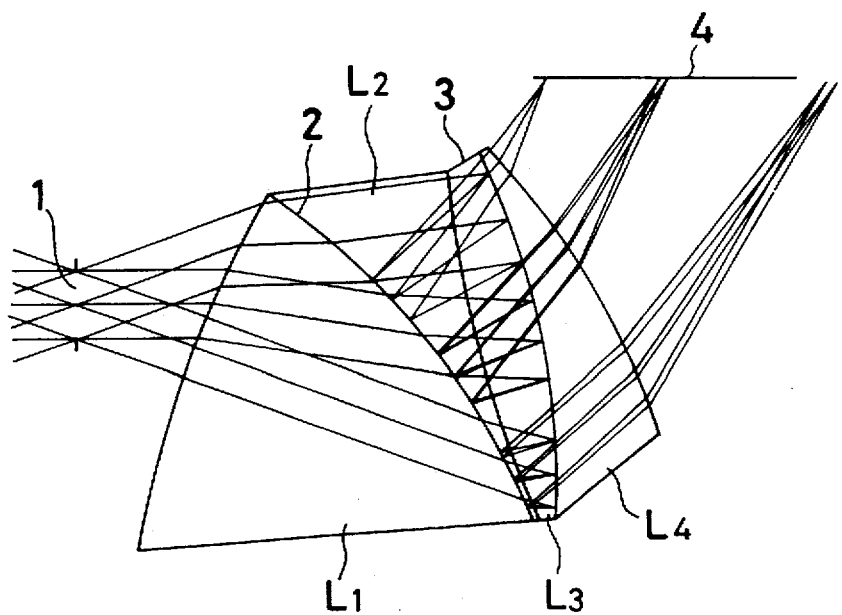
FIG. 14 shows the arrangement of an ocular optical system in Example 14 of the visual display apparatus according to the present invention.

FIG. 14 shows the optical arrangement of Example 14. This example is basically the same as Example 12. In this example, the field angle is 40° (in the YZ-plane), and the focal length F is 40 millimeters. F-number is 5.00. Numerical data in this example will be shown later.

Example 15

Figure 15:
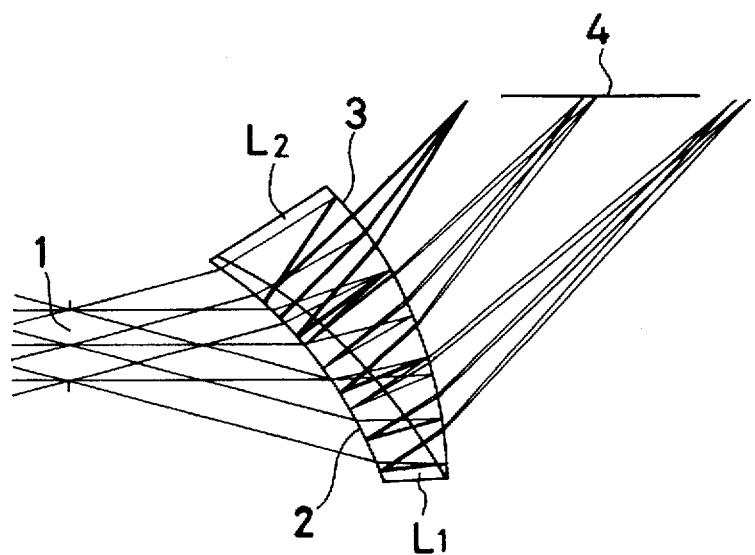
FIG. 15 shows the arrangement of an ocular optical system in Example 15 of the visual display apparatus according to the present invention.

FIG. 15 shows the optical arrangement of Example 15. The figure shows an optical system for the observer's right eye. An optical system for the observer's left eye is also arranged in the same way. In the figure, reference numeral 1 denotes a stop position (exit pupil position), 2 a first semitransparent mirror, 3 a second semitransparent mirror, and 4 an image surface (actually, an image display device, e.g., an LCD). In backward ray tracing, light emanating from the stop position 1 first passes through the first semitransparent mirror 2, and is reflected by the second semitransparent mirror 3. The reflected light is further reflected by the first semitransparent mirror 2, and then passes through the second semitransparent mirror 3 to reach the image surface 4.

In this example, two lenses $L_1$ and $L_2$ are disposed in the mentioned order from the stop side, and these lenses are cemented together. The first semitransparent mirror 2 is provided on the stop-side surface of the first lens $L_1$, and the second semitransparent mirror 3 on the image-side surface of the second lens $L_2$.

In this example, the field angle is 30° (in the YZ-plane), and the focal length F is 40 millimeters. F-number is 5.00. Numerical data in this example will be shown later.

Example 16

Figure 16:
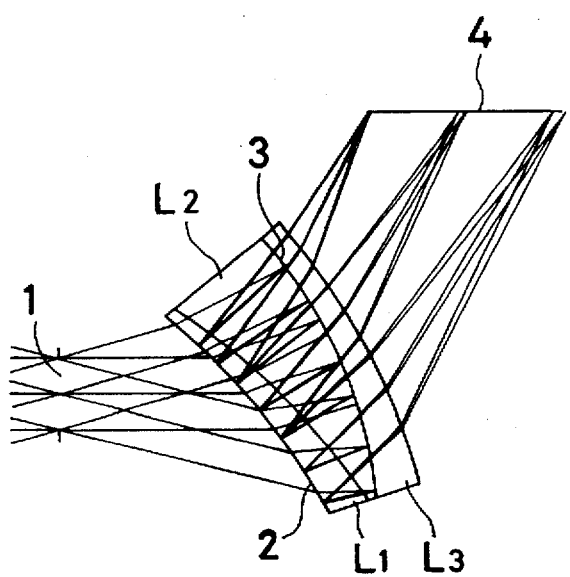
FIG. 16 shows the arrangement of an ocular optical system in Example 16 of the visual display apparatus according to the present invention.

FIG. 16 shows the optical arrangement of Example 16. The figure shows an optical system for the observer's right eye. An optical system for the observer's left eye is also arranged in the same way. In the figure, reference numeral 1 denotes a stop position (exit pupil position), 2 a first semitransparent mirror, 3 a second semitransparent mirror, and 4 an image surface (actually, an image display device, e.g., an LCD). In backward ray tracing, light emanating from the stop position 1 first passes through the first semitransparent mirror 2, and is reflected by the second semitransparent mirror 3. The reflected light is further reflected by the first semitransparent mirror 2, and then passes through the second semitransparent mirror 3 to reach the image surface 4.

In this example, three lenses $L_1$ to $L_3$ are disposed in the mentioned order from the stop side, and these three lenses are cemented together. The first semitransparent mirror 2 is provided on the stop-side surface of the first lens $L_1$, and the second semitransparent mirror 3 on the cemented surface defined between the second and third lenses $L_2$ and $L_3$.

In this example, the field angle is 30° (in the YZ-plane), and the focal length F is 40 millimeters. F-number is 5.00. Numerical data in this example will be shown later.

Example 17

Figure 17:
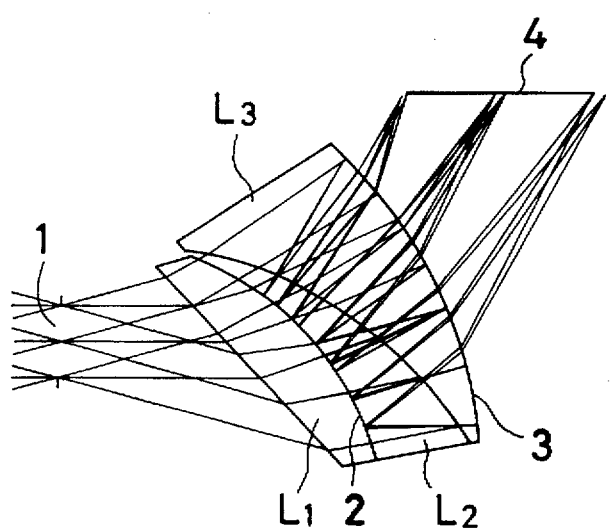
FIG. 17 shows the arrangement of an ocular optical system in Example 17 of the visual display apparatus according to the present invention.

FIG. 17 shows the optical arrangement of Example 17. The figure shows an optical system for the observer's right eye. An optical system for the observer's left eye is also arranged in the same way. In the figure, reference numeral 1 denotes a stop position (exit pupil position), 2 a first semitransparent mirror, 3 a second semitransparent mirror, and 4 an image surface (actually, an image display device, e.g., an LCD). In backward ray tracing, light emanating from the stop position 1 first passes through the first semitransparent mirror 2, and is reflected by the second semitransparent mirror 3. The reflected light is further reflected by the first semitransparent mirror 2, and then passes through the second semitransparent mirror 3 to reach the image surface 4.

In this example, three lenses $L_1$ to $L_3$ are disposed in the mentioned order from the stop side, and these three lenses are cemented together. The first semitransparent mirror 2 is provided on the cemented surface defined between the first and second lenses $L_1$ and $L_2$, and the second semitransparent mirror 3 on the image-side surface of the third lens $L_3$.

In this example, the field angle is 30° (in the YZ-plane), and the focal length F is 40 millimeters. F-number is 5.00. Numerical data in this example will be shown later.

The following is a description of a viewing angle limiting device for limiting the viewing angle of the image display device 4 in each ocular optical system of the present invention arranged as described above.

Figure 18A:
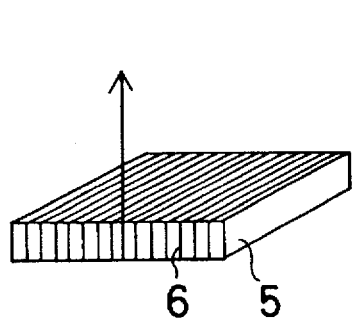
FIGS. 18(a) and 18(b) show one example of a louver optical element.
Figure 18B:
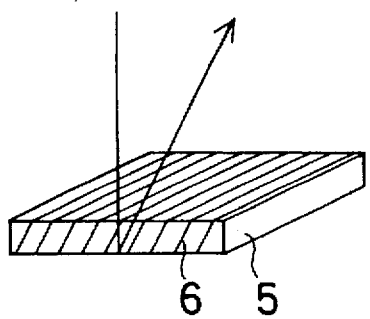
Figure 19A:
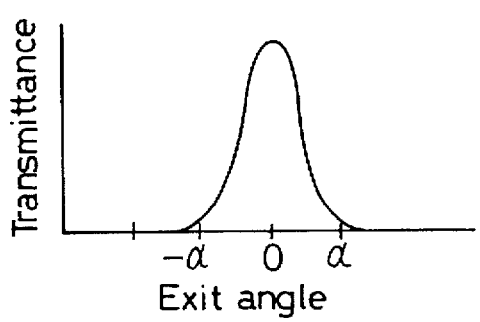
FIGS. 19(a) and 19(b) are graphs showing the transmittance distribution of the louver optical element shown in FIGS. 18(a) and 18(b).
Figure 19B:
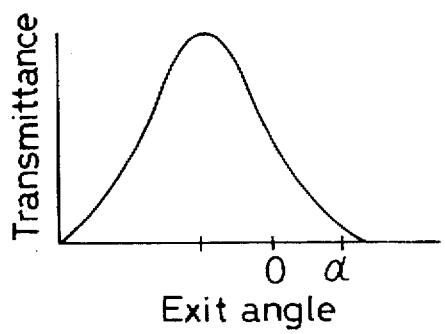

FIGS. 18(a) and 18(b) show one example of a louver optical element usable as a viewing angle limiting device. The illustrated louver optical element comprises a transparent film 5 having small light-blocking walls 6 which are periodically put therein. By changing the angle of the light-blocking walls 6 to the film surface, the incident angle for maximum transmittance can be changed. FIGS. 19(a) and 19(b) show the transmittance distribution of the louver optical element shown in FIGS. 18(a) and 18(b).

Figure 20:
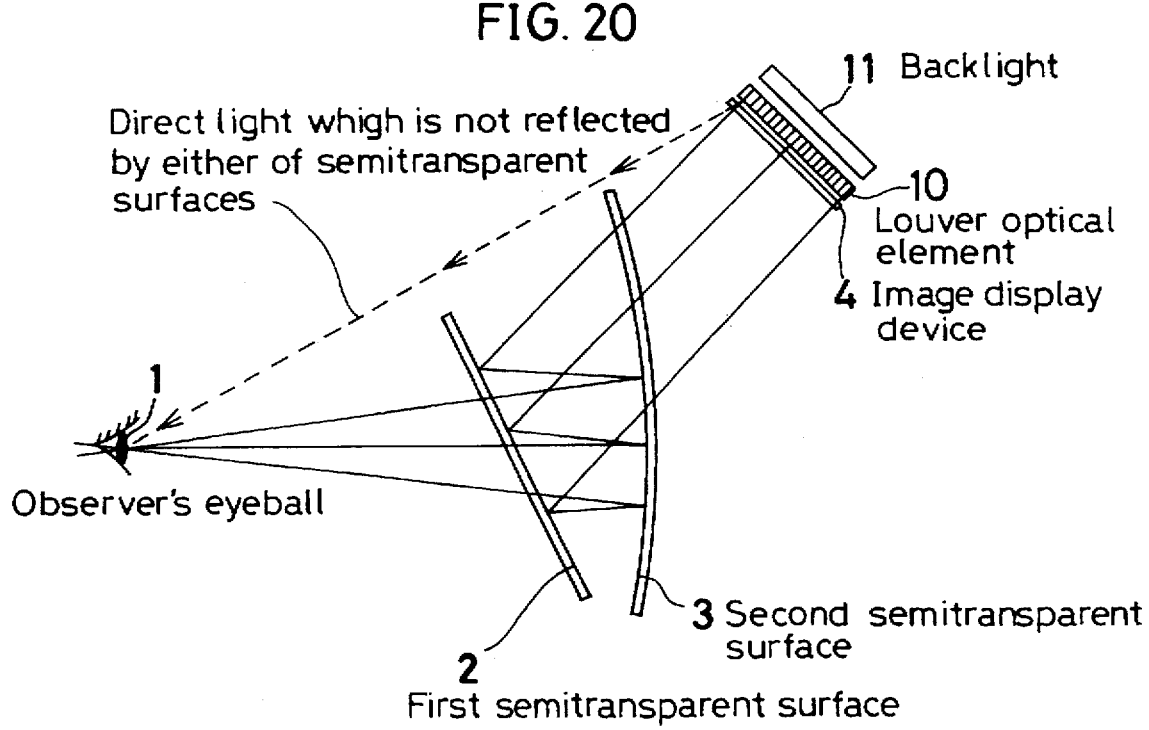
FIG. 20 shows an example in which the viewing angle is limited by a louver optical element.

By inserting such a louver optical element between a backlight and an image display device such as an LCD, the viewing angle of the image display device can be limited. FIG. 20 shows an example of such an arrangement. In the figure, light rays which reach the observer's eyeball without being reflected by either of the semitransparent surfaces 2 and 3 are shown by the dotted line. By inserting a louver optical element 10 between a backlight 11 and the image display device 4, the viewing angle is limited. Thus, the light rays shown by the dotted line are cut off by the louver optical element 10.

Figure 21A:
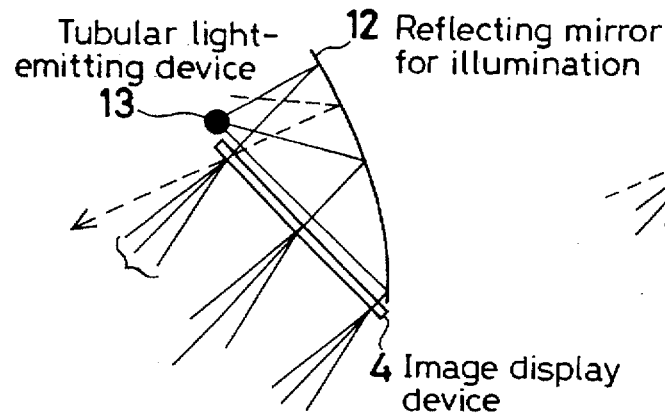
FIGS. 21(a) and 21(b) show examples in which the viewing angle is limited by an illumination system for an image display device.
Figure 21B:
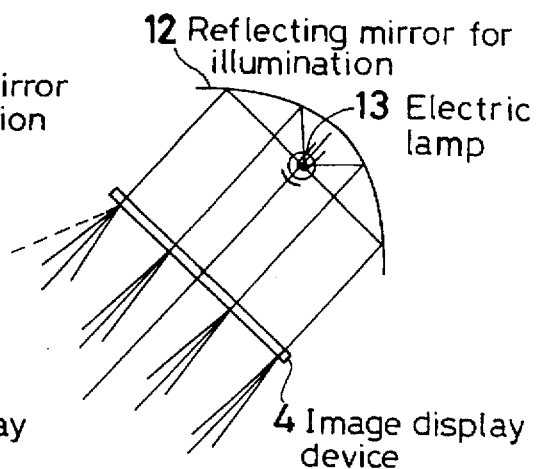

FIGS. 21(a) and 21(b) show examples in which the viewing angle is limited by an illumination system for illuminating the image display device 4. In either case, a reflecting mirror 12 is used to project an image of a light source 13 approximately at infinity. Consequently, light rays passing through the image display device 4 consist only of a bundle of approximately parallel rays. Accordingly, the displayed image cannot be seen from an oblique direction, and thus the viewing angle can be limited. That is, undesired light rays shown by the dotted line in the figures will not pass through the image display surface. Although in this example a reflecting mirror is employed, it should be noted that an optical element used to limit the viewing angle is not necessarily limited to a reflecting mirror, and that the same effect can be obtained by using a positive lens, an aspherical lens, a light guide, etc., as a matter of course.

The field angle of the ocular optical systems in the foregoing Examples 1 to 17 is 60° or less.

Incidentally, there have been conventional visual display apparatuses which provide a wide field angle, such as an apparatus which provides a field angle of 360° by projecting an image on a domed screen by a film projector or a TV projector (e.g., Japanese Patent Application Laid-Open (KOKAI) No. 02-178691), and an apparatus which provides a wide field angle by arranging television screens in side-by-side relation to each other. Such conventional visual display apparatuses are exhibited in ordinary theaters, exhibition pavilions, etc.

However, the above-described screen projection type visual display apparatus suffers from the disadvantage that if the screen is not sufficiently far away from the observer, the observer cannot recognize that he or she is viewing a distant image, and cannot enjoy the feeling of being at the actual spot. The reason for this is that the image that is viewed by the observer is displayed on the screen or the TV screen, and therefore, if the distance from the observer to the image display screen is less than several meters, the observer cannot feel the observation image to be present in the distance. More specifically, since the human eyes function so that they can focus on objects at different distances, if a distant image such as a landscape is displayed on a display screen which is close to the observer, the observer feels the distant image to be close to him or her.

In order to allow the observer to recognize a distant observation image to be present in the distance, there must be a sufficiently long distance from the observer to the display screen, resulting in a large-sized apparatus.

Further, the conventional visual display apparatus in which large-sized TV screens are arranged in side-by-side relation to each other suffers from the problem that the joint of each pair of adjacent TV screens is conspicuous. Therefore, the displayed image also lacks dynamic presence.

Thus, there has heretofore been no visual display apparatus in which importance is attached to dynamic presence, and which is designed to be so compact that it fits personal, group or family use and can readily be moved or loaded on a vehicle.

In the present invention, at least two ocular optical systems such as those in the foregoing Examples 1 to 17 are used so as to share an exit pupil position with each other, and image display devices which are associated with these ocular optical systems are arranged to display different images. Moreover, these displayed images are presented to the observer's eyeballs as images which are spatially combined together. Thus, it is possible to display a composite image at a wide field angle of 60° or more with the joint of the image display devices made inconspicuous.

In the actual specifications, the ocular optical system in any of Examples 1 to 17 may be used. However, it is preferable to set the focal length of the entire optical system at 100 millimeters or more. If the focal length is less than 100 millimeters, the ocular optical system is too close to the observer's head, causing the observer to feel sensation of pressure. It is even more preferable to set the focal length of the entire optical system at 200 millimeters or more. If the focal length is set at 200 millimeters or more, the diameter of the entrance pupil can be increased to 50 millimeters or more. Accordingly, it becomes possible for the observer to view the displayed image with both eyes.

The following is a description of Examples 18 to 21 in which the ocular optical system of Example 11 is mainly employed, and in which the display surfaces of a plurality of image display devices are joined together to increase the field angle.

Example 18

Figure 22:
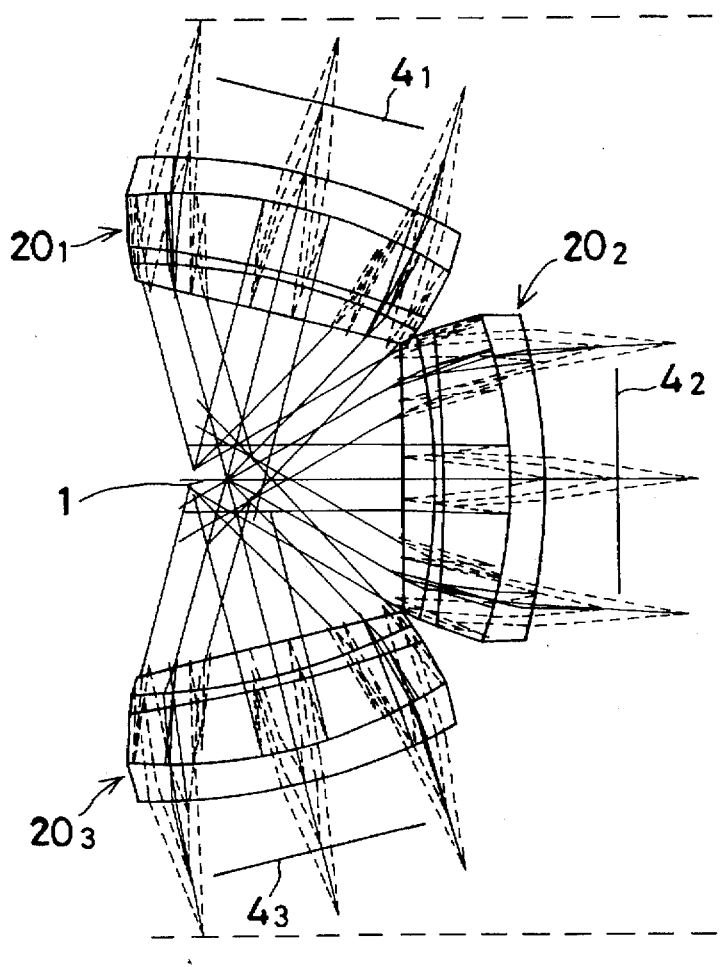
FIG. 22 shows the arrangement of the whole optical system of a visual display apparatus in Example 18 of the present invention.

FIG. 22 shows Example 18 in which three ocular optical systems $20_1$ to $20_3$ of Example 11 are arranged in side-by-side relation to each other in a plane (XZ-plane: FIG. 11(b)) which is perpendicular to the plane in which the optical elements are decentered. The focal length of each of the ocular optical systems $20_1$ to $20_3$ is 400 millimeters. The distance from the pupil position 1 to the 1st surface of each optical system is 250 millimeters. The overall size D is about 90 centimeters. Even if the image display devices $4_1$ to $4_3$ are included, the overall size of the system is less than 1 meter. The diameter of the exit pupil 1 is as large as 100 millimeters. Accordingly, the displayed image can be observed with both eyes. Even when the observer swings his/her head, there is no possibility of the displayed image being eclipsed.

Example 19

Figure 23:
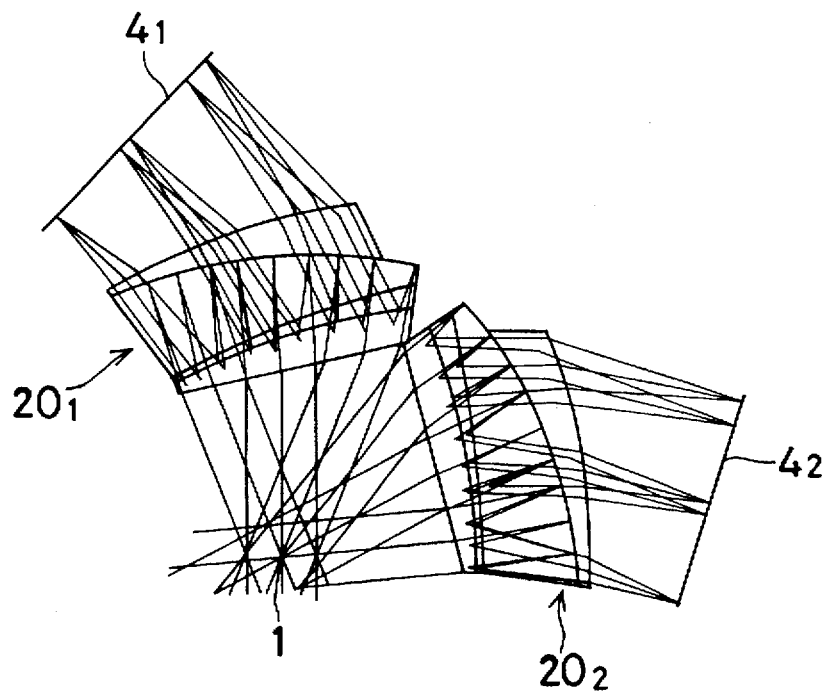
FIG. 23 shows the arrangement of the whole optical system of a visual display apparatus in Example 19 of the present invention.

FIG. 23 shows Example 19 in which two ocular optical systems $20_1$ and $20_2$ of Example 11 are arranged in side-by-side relation to each other in the plane (YZ-plane: FIG. 11(a)) in which the optical elements are decentered. The focal length of each of the ocular optical systems $20_1$ and $20_2$ can be set at any desired value by coefficient-multiplying the numerical data in Example 11.

Figure 24A:
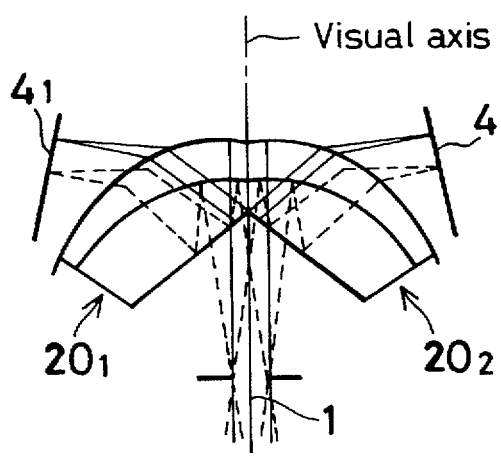
FIGS. 24(a) and 24(b) show modifications of the visual display apparatus in Example 19.
Figure 24B:
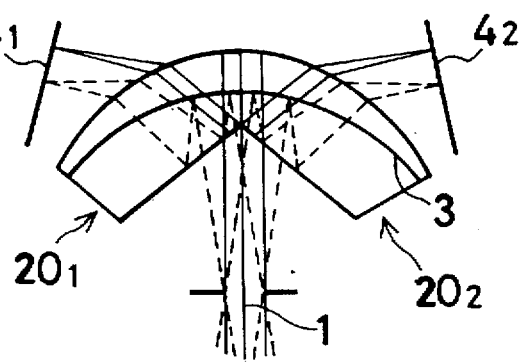

It should be noted that the two images may be superimposed on one another as shown in FIG. 24(a). That is, the system may be arranged such that the visual axis directions of the ocular optical systems $20_1$ and $20_2$ are matched with each other to make the two exit pupils 1 completely coincident with each other, thereby combining together the two images. By doing so, the joint of the two images can be made invisible. It is also possible to arrange the system so that the second semitransparent surfaces 3 of the two ocular optical systems $20_1$ and $20_2$ form a continuous surface, as shown in FIG. 24(b). In this case, the second semitransparent surfaces 3 can be formed as a continuous surface by appropriately selecting numerical data. Thus, the production of the apparatus is facilitated.

Example 20

Figure 25:
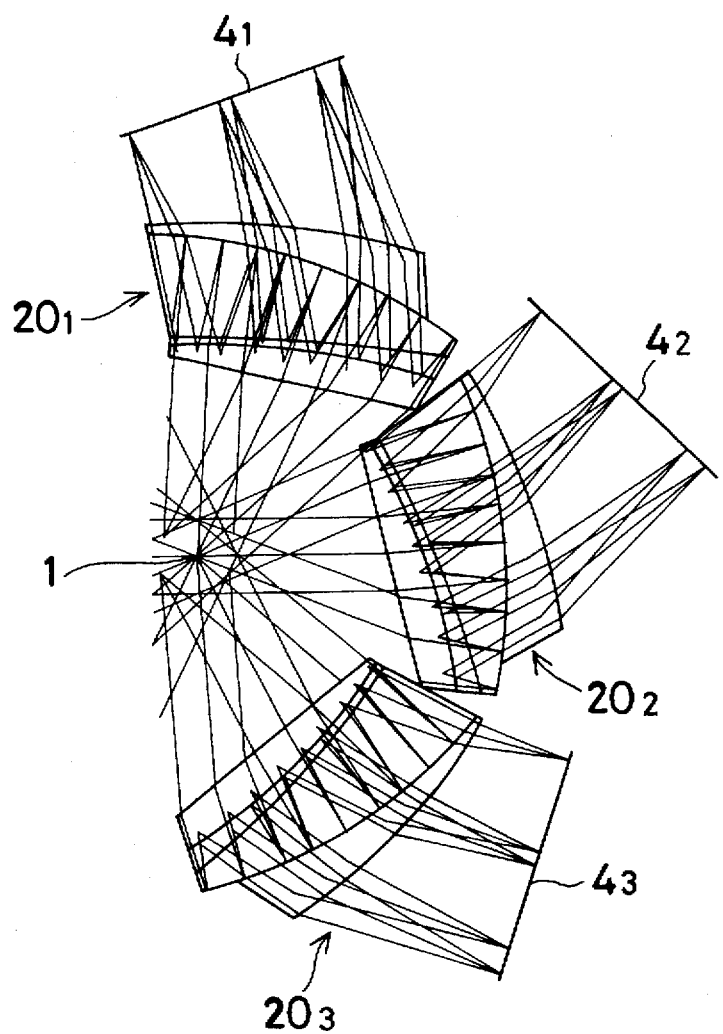
FIG. 25 shows the arrangement of the whole optical system of a visual display apparatus in Example 20 of the present invention.

FIG. 25 shows Example 20 in which three ocular optical systems $20_1$ to $20_3$ of Example 11 are arranged in side-by-side relation to each other in the plane (YZ-plane: FIG. 11(a)) in which the optical elements are decentered. This example is basically the same as Example 19.

Example 21

Figure 26:
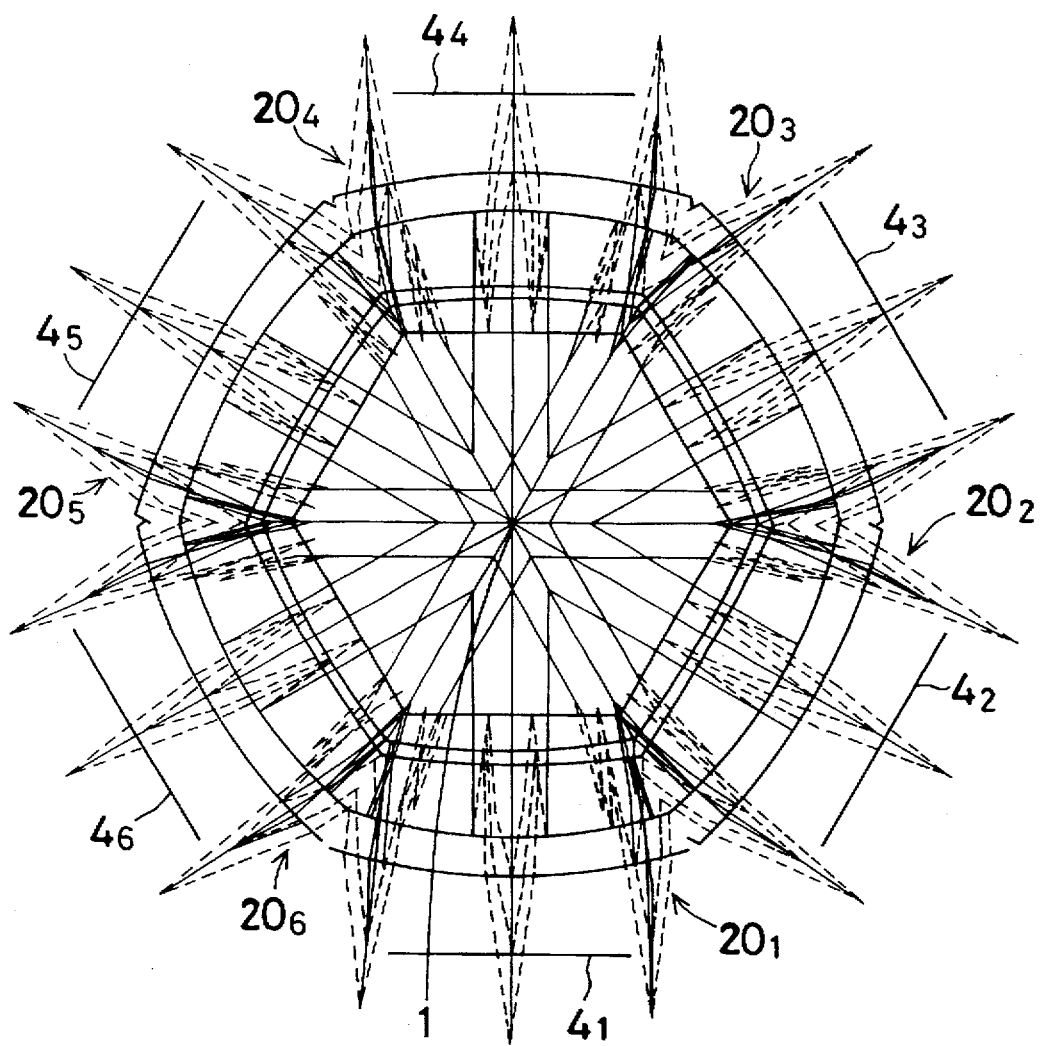
FIG. 26 shows the arrangement of the whole optical system of a visual display apparatus in Example 21 of the present invention.

FIG. 26 shows Example 21 in which six ocular optical systems $20_1$ to $20_6$ of Example 11 are circumferentially arranged in side-by-side relation to each other in a plane (XZ-plane: FIG. 11(b)) which is perpendicular to the plane in which the optical elements are decentered, with the exit pupil 1 defined as the center. By combining together six ocular optical systems $20_1$ to $20_6$ in this way, it becomes possible to observe the whole circumference through 360°.

Example 22

Figure 27:
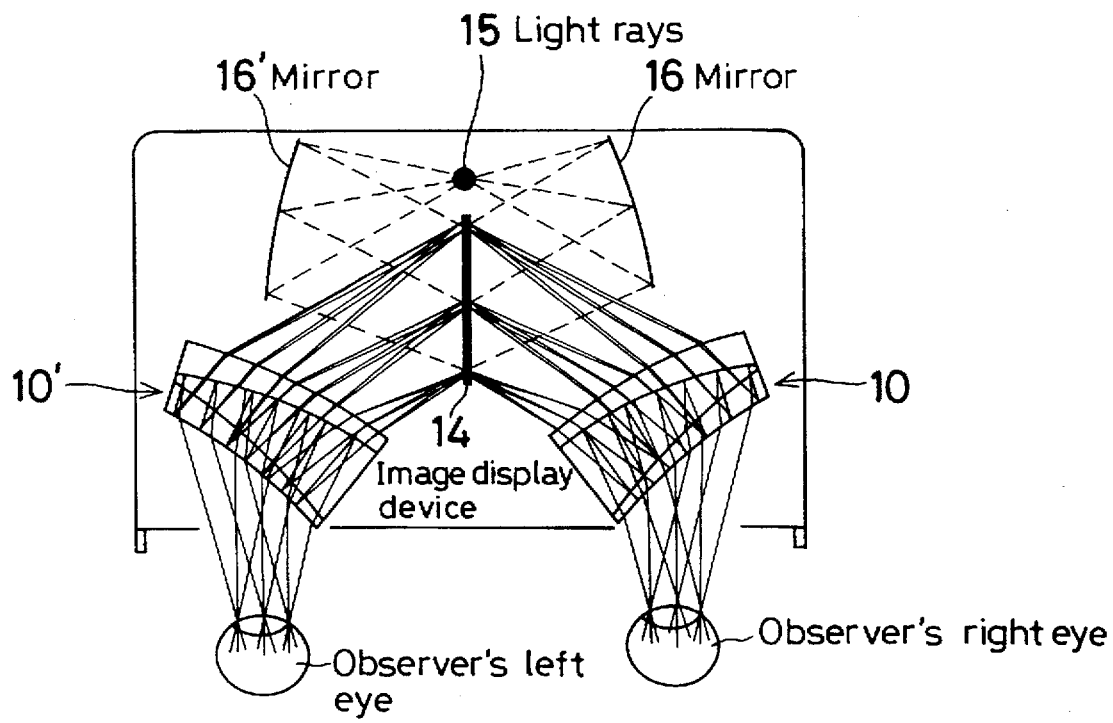
FIG. 27 shows the arrangement of an optical system in Example 22 of the present invention.

FIG. 27 shows the optical arrangement of Example 22. In this example, a pair of ocular optical systems 10 and 10' of Example 16 are used for the observer's right and left eyes, respectively. Reflection type LCDs are provided on both sides of an image display device 14, and images for the right and left eyes are displayed on the LCDs, respectively. Divergent light from a common light source 15 is converted by two mirrors 16 and 16' into two bundles of rays intersecting each other to illuminate the image display device 14 from both sides thereof, thereby effecting illumination for the display of the ocular optical system 10 for the right eye and for the display of the ocular optical system 10' for the left eye. The feature of this example resides in that the displayed image can be observed with both the right and left eyes, and the visual display apparatus has a common image display device. Accordingly, the visual display apparatus can be arranged in a compact form.

Example 23

Figure 28:
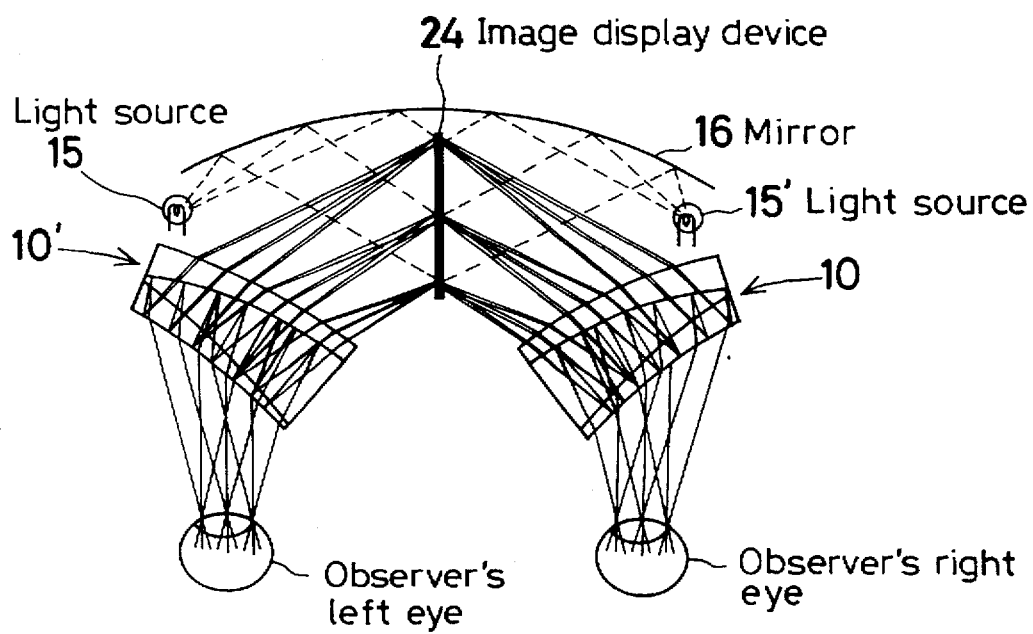
FIG. 28 shows the arrangement of an optical system in Example 23 of the present invention.

FIG. 28 shows the optical arrangement of Example 23. In this example, a pair of ocular optical systems 10 and 10' of Example 16 are used for the observer's right and left eyes, respectively, and one image display device 24 is made common to the two ocular optical systems 10 and 10'. Further, images with a disparity therebetween are presented to the right and left eyes, thereby realizing stereoscopic vision (it is, of course, possible to present images with no disparity to thereby perform ordinary display without three-dimensional depth). As shown in FIG. 28, the image display device 24 is illuminated by two light sources 15' and 15 for the left and right eyes. For the right eye, light rays emitted from the left light source 15 are reflected by an illumination mirror 16 so as to be led to the ocular optical system 10 for the right eye. For the left eye, light rays emitted from the right light source 15' are similarly led to the ocular optical system 10' for the left eye by the illumination mirror 16. Further, it is possible to realize stereoscopic vision by alternately displaying an image for the right eye and an image for the left eye on the image display device 24 synchronously with the on/off control of the left and right illumination systems. The feature of this example resides in that the displayed image can be observed with both the left and right eyes, and only one image display device, which is costly, is used. Accordingly, the visual display apparatus can be provided at reduced cost.

Figure 29:
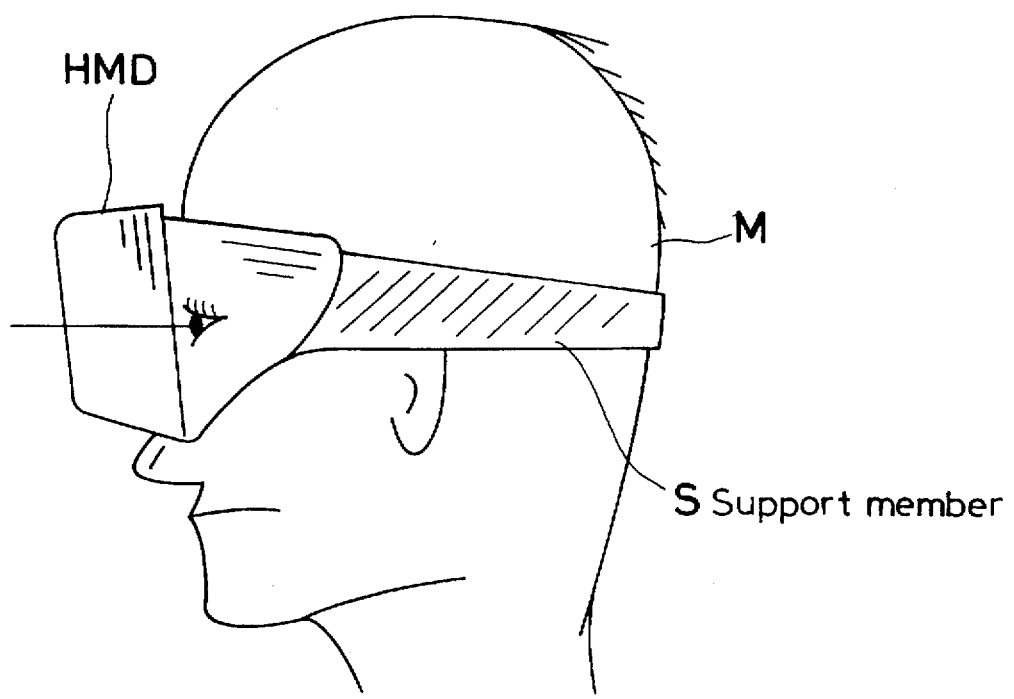
FIG. 29 is a perspective view showing a support member which may be used in the present invention when arranged as a head-mounted visual display apparatus.

It should be noted that the visual display apparatus in any Example of the present invention can be used as a head-mounted visual display apparatus. In this case, as shown in FIG. 29, ocular optical systems for the left and right eyes are provided in a visual display apparatus body HMD, and the body HMD is retained on the head of an observer M by a support member S, for example, a rubber band or belt, or a metal or plastic arm.

Numerical data in backward ray tracing about the ocular optical systems in the foregoing Examples 1 to 17 will be shown below.

| Surface No. | Curvature radius | Surface separation | nd | vd |
|---|---|---|---|---|
| Example 1 | | | | |
| 1 | pupil position | 29.635 | | |
| 2 | 541.6677 | 1.000 | 1.5163 | 64.1 |
| | | | A 25.664° | |
| 3 | 541.6677 | 10.394 | | |
| | | | A 25.664° | |
| 4 | −89.8308 (reflecting surface) | −10.394 | A 1.414° | |
| 5 | 541.6677 (reflecting surface) | 10.394 | A 25.664° | |
| 6 | −89.8308 | 1.000 | 1.5163 | 64.1 |
| | | | A 1.414° | |
| 7 | −89.8308 | 10.131 | | |
| | | | A 1.414° | |
| 8 | image surface | | | |
| | | | A 46.197° | |
| | | | Y 23.061 | |
| Example 2 | | | | |
| 1 | pupil position | 33.348 | | |
| 2 | −40.6508 | 4.500 | 1.5163 | 64.1 |
| | | | A 5.187° | |
| 3 | −38.4396 | 8.288 | | |
| | | | A −0.670° | |
| 4 | −38.6875 | 1.490 | 1.5163 | 64.1 |
| | | | A −8.497° | |
| 5 | −44.3497 (reflecting surface) | −1.490 | 1.5163 | 64.1 |
| | | | A −4.532° | |
| 6 | −38.6875 | −8.288 | | |
| | | | A −8.497° | |
| 7 | −38.4396 | −4.500 | 1.5163 | 64.1 |
| | | | A −0.670° | |
| 8 | −40.6508 (reflecting surface) | 4.500 | 1.5163 | 64.1 |
| | | | A 5.187° | |
| 9 | −38.4396 | 8.288 | | |
| | | | A −0.670° | |
| 10 | −38.6875 | 1.490 | 1.5163 | 64.1 |
| | | | A −8.497° | |
| 11 | −44.3497 | 2.664 | | |
| | | | A −4.532° | |
| 12 | image surface | | | |
| | | | A 34.079° | |
| | | | Y 10.094 | |
| Example 3 | | | | |
| 1 | pupil position | 41.183 | | |
| 2 | −36.5085 | 10.193 | 1.5163 | 64.1 |
| | | | A −17.011° | |
| 3 | −40.9731 | 2.800 | | |
| | | | A −15.688° | |
| 4 | −40.1755 | 1.316 | 1.5163 | 64.1 |
| | | | A −18.732° | |
| 5 | −42.8084 (reflecting surface) | −1.316 | 1.5163 | 64.1 |
| | | | A −20.456° | |
| 6 | −40.1755 | −2.800 | | |
| | | | A −18.732° | |
| 7 | −40.9731 | −10.193 | 1.5163 | 64.1 |
| | | | A −15.689° | |
| 8 | −36.5085 (reflecting surface) | 10.193 | 1.5163 | 64.1 |
| | | | A −17.011° | |
| 9 | −40.9731 | 2.800 | | |
| | | | A −15.689° | |
| 10 | −40.1755 | 1.316 | 1.5163 | 64.1 |
| | | | A −18.732° | |
| 11 | −42.8084 | 5.789 | | |
| | | | A −20.456° | |
| 12 | image surface | | | |
| | | | A 25.354° | |
| | | | Y 20.275 | |
| Example 4 | | | | |
| 1 | pupil position | 11.577 | | |
| 2 | −92.3567 | 10.000 | 1.5163 | 64.1 |
| | | | A 5.616° | |
| 3 | −24.9860 | 1.254 | | |
| | | | A −5.687° | |
| 4 | −22.9685 | 6.461 | 1.5163 | 64.1 |
| | | | A −10.559° | |
| 5 | −63.1583 (reflecting surface) | −6.461 | 1.5163 | 64.1 |
| | | | A −9.956° | |
| 6 | −22.9685 | −1.254 | | |
| | | | A −10559° | |
| 7 | −24.9860 | −10.000 | 1.5163 | 64.1 |
| | | | A −5.597° | |
| 8 | −92.3567 (reflecting surface) | 10.000 | 1.5163 | 64.1 |
| | | | A 5.616° | |
| 9 | −24.9860 | 1.254 | | |
| | | | A −5.687° | |
| 10 | −22.9685 | 6.461 | 1.5163 | 64.1 |
| | | | A −10.559° | |
| 11 | −63.1583 | 2.051 | | |
| | | | A −9.956° | |
| 12 | image surface | | | |
| | | | A 26.653° | |
| | | | Y 23.977 | |
| Example 5 | | | | |
| 1 | pupil position | 20.993 | | |
| 2 | −179.5534 | 2.956 | 1.6545 | 33.6 |
| | | | A 21.828° | |
| 3 | 757.7696 | 3.290 | | |
| | | | A 26.016° | |
| 4 | 5604.7443 | 9.156 | 1.6700 | 51.6 |
| | | | A 18.909° | |
| 5 | −88.4542 (reflecting surface) | −9.156 | 1.6700 | 51.6 |
| | | | A 4.953° | |
| 6 | 5604.7443 | −3.290 | | |
| | | | A 18.909° | |
| 7 | 757.7696 | −2.956 | 1.6545 | 33.6 |
| | | | A 26.016° | |
| 8 | −179.5534 (reflecting surface) | 2.956 | 1.6545 | 33.6 |
| | | | A 21.828° | |
| 9 | 757.7696 | 3.290 | | |
| | | | A 26.016° | |
| 10 | 5604.7443 | 9.156 | 1.6700 | 51.6 |
| | | | A 18.909° | |
| 11 | −88.4542 | 9.620 | | |
| | | | A 4.953° | |
| 12 | image surface | | | |
| | | | A 38.609° | |
| | | | Y 21.907 | |
| Example 6 | | | | |
| 1 | pupil position | 39.289 | | |
| 2 | 132.4783 | 2.212 | 1.5163 | 64.1 |
| | | | A 17.118° | |
| 3 | −420.6544 | 8.020 | | |
| | | | A 18.206° | |
| 4 | −81.1043 (reflecting surface) | −8.020 | | |
| | | | A −9.535° | |
| 5 | −420.6544 (reflecting surface) | 8.020 | | |
| | | | A 18.206° | |
| 6 | −81.1043 | 0.8550 | 1.5163 | 64.1 |
| | | | A −9.535° | |
| 7 | −83.8536 | 5.513 | | |
| | | | A −10.122° | |
| 8 | image surface | | | |
| | | | A 49.261° | |
| | | | Y 24.940 | |
| Example 7 | | | | |
| 1 | pupil position | 16.891 | | |
| 2 $R_y$ | −100.6022 | 9.000 | 1.6545 | 33.6 |
| $R_x$ | −107.1858 | | A 34.050° | |
| $K_x$ | 0.0000 | | Y 7.494 | |
| $K_y$ | 0.000 | | | |
| AR | $-0.384580 \times 10^{-6}$ | | | |

-continued

| Surface No. | Curvature radius | Surface separation | nd | vd |
|---|---|---|---|---|
| AP | $0.547177 \times 10^{-1}$ | | | |
| BR | $0.265474 \times 10^{-11}$ | | | |
| BP | $-0.163236 \times 10^{+1}$ | | | |
| 3 | −162.9235 | 2.881 | | |
| | | | A 37.247° | |
| 4 | −164.0867 | 1.703 | 1.6700 | 51.6 |
| | | | A 31.116° | |
| 5 $R_y$ | −71.0190 | −1.703 | 1.6700 | 51.6 |
| $R_x$ | −73.855 | | A 31.902° | |
| | (reflecting surface) | | Y 26.190 | |
| $K_x$ | 0.0000 | | | |
| $K_y$ | 0.0000 | | | |
| AR | $-0.198784 \times 10^{-7}$ | | | |
| AP | −0.786920 | | | |
| BR | $-0.197584 \times 10^{-10}$ | | | |
| BP | $-0.498223 \times 10^{-2}$ | | | |
| 6 | −164.0867 | −2.881 | | |
| | | | A 31.116° | |
| 7 | −162.9235 | −9.000 | 1.6545 | 33.6 |
| | | | A 37.247° | |
| 8 $R_y$ | −100.6022 | 9.000 | 1.6545 | 33.6 |
| $R_x$ | −107.1858 | | A 34.050° | |
| | (reflecting surface) | | Y 7.494 | |
| $K_x$ | 0.0000 | | | |
| $K_y$ | 0.0000 | | | |
| AR | $-0.384580 \times 10^{-6}$ | | | |
| AP | $0.547177 \times -1$ | | | |
| BR | $0.265474 \times 10^{-11}$ | | | |
| BP | $-0.163236 \times 10^{+1}$ | | | |
| 9 | −162.9235 | 2.881 | | |
| | | | A 37.247° | |
| 10 | −164.0867 | 1.703 | 1.6700 | 51.6 |
| | | | A 31.116° | |
| 11 $R_y$ | −71.0190 | 13.139 | 1.6700 | 51.6 |
| $R_x$ | −73.8855 | | A 31.902° | |
| $K_x$ | 0.0000 | | Y 26.190 | |
| $K_y$ | 0.0000 | | | |
| AR | $-0.198784 \times 10^{-7}$ | | | |
| AP | −0.786920 | | | |
| BR | $-0.197584 \times 10^{-10}$ | | | |
| BP | $-10498223 \times 10^{-2}$ | | | |
| 12 | image surface | | | |
| | | | A 55.782° | |
| | | | Y 19.107 | |

Example 8

| 1 | pupil position | 15.000 | | |
| 2 | −520.2173 | 3.691 | 1.5163 | 64.1 |
| | | | A 19.493° | |
| 3 | −56.7996 | 3.871 | | |
| | | | A 25.341° | |
| 4 | −154.5795 | 0.750 | 1.6364 | 35.4 |
| | | | A 38.609° | |
| 5 | 157.6785 | 15.237 | 1.6031 | 60.7 |
| | | | A 41.198° | |
| 6 | −95.2272 | −15.237 | 1.6031 | 60.7 |
| | (reflecting surface) | | A 22.236° | |
| 7 | 157.6785 | −0.750 | 1.6364 | 35.4 |
| | | | A 41.198° | |
| 8 | −154.5796 | 0.7550 | 1.6364 | 35.4 |
| | (reflecting surface) | | A 38.609° | |
| 9 | 157.6785 | 15.237 | 1.6031 | 60.7 |
| | | | A 41.198° | |
| 10 | −95.2272 | 11.168 | | |
| | | | A 22.236° | |
| 11 | image surface | | | |
| | | | A 46.494° | |
| | | | Y 17.062 | |

Example 9

| 1 | pupil position | 26.483 | | |
| 2 | 278.0659 | 7.752 | 1.5163 | 64.1 |
| | | | A 80.15° | |
| 3 | −89.1281 | 7.876 | 1.5163 | 64.1 |
| | | | A 22.388° | |
| 4 | −65.3728 | −7.876 | 1.5163 | 64.1 |
| | (reflecting surface) | | A 2.013° | |
| 5 | −89.1281 | 7.876 | 1.5163 | 64.1 |
| | (reflecting surface) | | A 22.388° | |
| 6 | −65.3728 | 6.423 | 1.7552 | 27.5 |
| | | | A 2013° | |
| 7 | −83.9275 | 8.411 | | |
| | | | A 10.935° | |
| 8 | image surface | | | |
| | | | A 58.644° | |
| | | | Y 25.640 | |

Example 10

| 1 | pupil position | 17.782 | | |
| 2 | −297.9593 | 12.417 | 1.5163 | 64.1 |
| | | | A −5.716° | |
| 3 $R_y$ | −154.2588 | 7.120 | 1.5163 | 64.1 |
| $R_x$ | −184.4469 | | A 13.178° | |
| $K_x$ | 0.0000 | | Y −21.116 | |
| $K_y$ | 0.0000 | | | |
| AR | $0.154678 \times 10^{-6}$ | | | |
| AP | $0.295303 \times 10^{-3}$ | | | |
| BR | 0.0000 | | | |
| BP | 0.0000 | | | |
| 4 | −76.1672 | −7.120 | 1.5163 | 64.1 |
| | (reflecting surface) | | A 1.327° | |
| 5 $R_y$ | −154.2588 | 7.120 | 1.5163 | 64.1 |
| $R_x$ | −184.4469 | | A 13.178° | |
| | (reflecting surface) | | Y −21.116 | |
| $K_x$ | 0.0000 | | | |
| $K_y$ | 0.0000 | | | |
| AR | $0.154678 \times 10^{-6}$ | | | |
| AP | $0.295303 \times 10^{-3}$ | | | |
| BR | 0.0000 | | | |
| BP | 0.0000 | | | |
| 6 | −76.10692 | 3.700 | 1.7552 | 27.5 |
| | | | A 1.327° | |
| 7 | −108.0370 | 5.6656 | | |
| | | | A 10.079° | |
| 8 | image surface | | | |
| | | | A 42.621° | |
| | | | Y 18.009 | |

Example 11

| 1 | pupil position | 25.518 | | |
| 2 | ∞ | 4.677 | 1.6779 | 55.3 |
| | | | A 13.120° | |
| 3 | −88.9051 | 1.313 | 1.8052 | 25.4 |
| | | | A 18.598° | |
| 4 | −170.6280 | 9.967 | 1.6779 | 55.3 |
| | | | A 21.345° | |
| 5 | −69.0192 | −9.967 | 1.6779 | 55.3 |
| | (reflecting surface) | | A 3.467° | |
| 6 | −170.6280 | −1.313 | 1.8052 | 25.4 |
| | | | A 21.345° | |
| 7 | −88.9051 | 1.313 | 1.8052 | 25.4 |
| | (reflecting surface) | | A 18.598° | |
| 8 | −170.6280 | 9.967 | 1.6779 | 55.3 |
| | | | A 21.345° | |
| 9 | −69.0192 | 5.039 | 1.6860 | 49.1 |
| | | | A 3.467° | |
| 10 | −85.0914 | 10.469 | | |
| | | | A 13.229° | |
| 11 | image surface | | | |
| | | | A 45.395° | |
| | | | Y 21.841 | |

Example 12

| 1 | pupil position | 20.762 | | |
| 2 | 156.2166 | 18.778 | 1.6238 | 36.7 |
| | | | A −21.772° | |
| 3 | −90.6659 | 8.826 | 1.8035 | 35.8 |
| | | | A 40.117° | |
| 4 | 79.9707 | 5.676 | 1.7740 | 42.3 |

-continued

| Surface No. | Curvature radius | Surface separation | nd | vd |
|---|---|---|---|---|
| 5 | −75.8013 (reflecting surface) | −5.676 | 1.7740 A 6.483° A 10.916° | 42.3 |
| 6 | 79.9707 | −8.826 | 1.7740 A 6.483° | 42.3 |
| 7 | −90.6659 (reflecting surface) | 8.826 | 1.8035 A 40.117° | 35.8 |
| 8 | 79.9707 | 5.676 | 1.7740 A 6.483° | 42.3 |
| 9 | −75.8013 | 8.110 | 1.8052 A 10.916° | 25.4 |
| 10 | −87.3677 | 5.363 | A 28.706° | |
| 11 | image surface | | A 90.000° Y 27.814 | |

$\phi_1/\phi_i = 0.4457$
Example 13

| 1 | pupil position | 14.683 | | |
|---|---|---|---|---|
| 2 | 253.7238 | 21.016 | 1.5866 A −36.795° | 42.2 |
| 3 | −81.4263 | 9.000 | 1.8033 A 36.492° | 36.3 |
| 4 | 117.5685 | 7.415 | 1.7699 A 3.909° | 43.1 |
| 5 | −72.5103 (reflecting surface) | −7.415 | 1.7699 A 8.735° | 43.1 |
| 6 | 117.5685 | −9.000 | 1.8033 A 3.909° | 36.3 |
| 7 | −81.4263 (reflecting surface) | 9.000 | 1.8033 A 36.492° | 36.3 |
| 8 | 117.5685 | 7.415 | 1.8033 A 3.909° | 36.3 |
| 9 | −72.5103 | 6.158 | 1.8052 A 8.735° | 25.4 |
| 10 | −80.0649 | 12.830 | A 24.689° | |
| 11 | image surface | | A 90.000° Y 24.355 | |

$\phi_1/\phi_i = 0.4055$
Example 14

| 1 | pupil position | 16.193 | | |
|---|---|---|---|---|
| 2 | 159.8594 | 20.366 | 1.6022 A −23.379° | 39.6 |
| 3 | −92.6782 | 8.500 | 1.8031 A 42.459° | 36.9 |
| 4 | 90.1973 | 8.377 | 1.7664 A 11.167° | 44.2 |
| 5 | −77.5454 (reflecting surface) | −8.377 | 1.7664 A 13.504° | 44.2 |
| 6 | 90.1973 | −8.500 | 1.8031 A 11.167° | 36.9 |
| 7 | −92.6782 (reflecting surface) | 8.500 | 1.8031 A 42.459° | 36.9 |
| 8 | 90.1973 | 8.377 | 1.7664 A 11.167° | 44.2 |
| 9 | −77.5454 | 7.623 | 1.8052 A 13.504° | 25.4 |
| 10 | −86.3826 | 7.823 | A 29.275° | |
| 11 | image surface | | A 90.000° Y 26.056 | |

$\phi_1/\phi_i = 0.4718$
Example 15

| 1 | pupil position | 27.475 | | |
|---|---|---|---|---|
| 2 | −47.2538 | 4.386 | 1.6953 A 39.878° | 30.4 |
| 3 | −56.7531 | 8.991 | 1.5732 A 46.089° | 61.8 |

-continued

| Surface No. | Curvature radius | Surface separation | nd | vd |
|---|---|---|---|---|
| 4 | −47.9929 (reflecting surface) | −8.991 | 1.5732 A 18.800° | 61.8 |
| 5 | −56.7531 | −4.386 | 1.6953 A 46.089° | 30.4 |
| 6 | −47.2538 (reflecting surface) | 4.386 | 1.6953 A 39.878° | 30.4 |
| 7 | −56.7531 | 8.991 | 1.5732 A 46.089° | 61.8 |
| 8 | −47.9929 | 19.932 | A 18.800° | |
| 9 | image surface | | A 90.000° Y 28.116 | |

$\phi_1/\phi_i = 0.5121$
Example 16

| 1 | pupil position | 21.768 | | |
|---|---|---|---|---|
| 2 | −71.6399 | 3.630 | 1.8052 A 41.582° | 25.4 |
| 3 | −82.1256 | 8.500 | 1.5966 A 45.769° | 61.1 |
| 4 | −56.4391 (reflecting surface) | −8.500 | 1.5966 A 18.960° | 61.1 |
| 5 | −82.1256 | −3.630 | 1.8052 A 45.769° | 25.4 |
| 6 | −71.6399 (reflecting surface) | 3.630 | 1.8052 A 41.582° | 25.4 |
| 7 | −82.1256 | 8.500 | 1.5966 A 45.769° | 61.1 |
| 8 | −56.4391 | 4.200 | 1.6027 A 18.960° | 39.5 |
| 9 | −70.4193 | 8.890 | A 22.722° | |
| 10 | image surface | | A 90.000° Y 32.574 | |

$\phi_1/\phi_i = 0.5086$
Example 17

| 1 | pupil position | 20.000 | | |
|---|---|---|---|---|
| 2 | −561.5386 | 10.000 | 1.5160 A 44.390° | 64.0 |
| 3 | −34.0012 | 8.500 | 1.8090 A 41.803° | 26.2 |
| 4 | −45.1967 | 8.500 | 1.7936 A 50.061° | 47.3 |
| 5 | −50.5985 (reflecting surface) | −8.500 | 1.7936 A 17.803° | 47.3 |
| 6 | −45.1967 | −8.500 | 1.8090 A 50.061° | 26.2 |
| 7 | −34.0012 (reflecting surface) | 8.500 | 1.8090 A 41.803° | 26.2 |
| 8 | −45.1967 | 8.500 | 1.7936 A 50.061° | 47.3 |
| 9 | −50.5985 | 5.006 | A 17.803° | |
| 10 | image surface | | A 90.000° Y 27.971 | |

$\phi_1/\phi_i = 0.4645$

As will be clear from the foregoing description, the present invention provides a small-sized, lightweight and inexpensive head- or face-mounted visual display apparatus which enables observation of a full-color image at a wide field angle, which is clear and flat as far as the edges thereof, without using a costly element such as a polarizing element.

What we claim is:

1. A visual display apparatus comprising:

an image display means for displaying an image; and an ocular optical system for projecting an image formed by said image-display means and for leading the projected image to an observer's eyeball;

said image-display means having means for limiting a viewing angle;

said ocular optical system having at least two semitransparent surfaces being defined as first and second semitransparent surfaces in order from the observer's eyeball side, said second semitransparent surface being a curved surface which is concave toward the observer's eyeball side, so that light rays emanating from said image display means first pass through said second semitransparent curved surface, and are reflected by said first semitransparent surface, and the reflected light rays are further reflected by said second semitransparent curved surface, and then pass through said first semitransparent surface to enter the observer's eyeball, and said at least two semitransparent surfaces being disposed such that at least said first semitransparent surface is decentered with respect to an observer's visual axis directed to see a center of the projected image, wherein said means for limiting a viewing angle is a louver optical system.

2. A visual display apparatus according to claim 1, comprising a plurality of said image display means, and a plurality of said ocular optical systems, said ocular optical systems being associated with said image display means, respectively, said plurality of image display means being arranged to display a plurality of different images.

3. A visual display apparatus comprising:

an image display means for displaying an image; and an ocular optical system for projecting an image formed by said image display means and for leading the projected image to an observer's eyeball, said ocular optical system having at least two semitransparent surfaces, said at least two semitransparent surfaces being defined as first and second semitransparent surfaces in order from the observer's eyeball side, said second semitransparent surface being a curved surface which is concave toward the observer's eyeball side, so that light rays emanating from said image display means first pass through said second semitransparent curved surface, and are reflected by said first semitransparent surface, and then reflected light rays are further reflected by said second semitransparent surface to enter the observer's eyeball, said image display means being tilted with respect to an axial principal ray which emanates from a center of said image display means, and which is incident on an approximately central point of an observer's eyeball-side exit pupil which is formed by said ocular optical system, wherein both the at least two semitransparent surfaces of said ocular optical system are curved surfaces which are concave toward the observer's eyeball side.

4. A visual display apparatus according to claim 3, wherein both the at least two semitransparent surfaces of said ocular optical system are decentered with respect to said visual axis.

5. A visual display apparatus according to claim 4, wherein said image display means is deviated from said visual axis, and the at least two semitransparent surfaces of said ocular optical system are decentered so that a surface separation between said semitransparent surfaces increases in a direction in which said image display means is deviated from said visual axis.

6. A visual display apparatus comprising:

an image display means for displaying an image; and an ocular optical system for projecting an image formed by said image display means and for leading the projected image to an observer's eyeball, said ocular optical system having at least two semitransparent surfaces, said at least two semitransparent surfaces being defined as first and second semitransparent surfaces in order from the observer's eyeball side, said second semitransparent surface being a curved surface which is concave toward the observer's eyeball side, so that light rays emanating from said image display means first pass through said second semitransparent curved surface, and are reflected by said first semitransparent surface, and then reflected light rays are further reflected by said second semitransparent surface to enter the observer's eyeball, said image display means being tilted with respect to an axial principal ray which emanates from a center of said image display means, and which is incident on an approximately central point of an observer's eyeball-side exit pupil which is formed by said ocular optical system, said image display means is also tilted with respect to an observer's visual axis directed to see a center of the projected image, said image display means is at least 45° tilted with respect to the observer's visual axis directed to see a center of the projected image, wherein a tilt angle $\theta_1$ of said first semitransparent surface with respect to said visual axis and a tilt angle $\theta_i$ of said image display means with respect to said visual axis satisfy the following condition:

$0.1 < \theta_1/\theta_i < 0.9$

7. A visual display apparatus comprising:

an image display means for displaying an image; and an ocular optical system for projecting an image formed by said image display means and for leading the projected image to an observer's eyeball, said ocular optical system having at least two semitransparent surfaces, said at least two semitransparent surfaces being defined as first and second semitransparent surfaces in order from the observer's eyeball side, said second semitransparent surface being a curved surface which is concave toward the observer's eyeball side, so that light rays emanating from said image display means first pass through said second semitransparent curved surface, and are reflected by said first semitransparent surface, and then reflected light rays are further reflected by said second semitransparent surface to enter the observer's eyeball, said image display means being tilted with respect to an axial principal ray which emanates from a center of said image display means, and which is incident on an approximately central point of an observer's eyeball-side exit pupil which is formed by said ocular optical system, said image display means is also tilted with respect to an observer's visual axis directed to see a center of the projected image, said image display means is at least 45° tilted with respect to the observer's visual axis directed to see a center of the projected image, wherein a tilt angle $\theta_1$ of said first semitransparent surface with respect o said visual axis and a tilt angle $\theta_i$ of said image display means with respect to said visual axis satisfy the following condition:

$0.2 < \theta_1/\theta_i < 0.7$

8. A visual display apparatus comprising:

an image display means for displaying an image; and an ocular optical system for projecting an image formed by said image display means and for leading the projected image to an observer's eyeball, said ocular optical system having at least two semitransparent surfaces, said at least two semitransparent surfaces being defined as first and second semitransparent surfaces in order from the observer's eyeball side, said second semitransparent surface being a curved surface which is concave toward the observer's eyeball side, so that light rays emanating from said image display means first pass through said second semitransparent curved surface, and are reflected by said first semitransparent surface, and then reflected light rays are further reflected by said second semitransparent surface to enter the observer's eyeball, said image display means being tilted with respect to an axial principal ray which emanates from a center of said image display means, and which is incident on an approximately central point of an observer's eyeball-side exit pupil which is formed by said ocular optical system, said image display means is also tilted with respect to an observer's visual axis directed to see a center of the projected image, said image display means is at least 45° tilted with respect to the observer's visual axis directed to see a center of the projected image, wherein a tilt angle $\theta_1$ of said first semitransparent surface with respect to said visual axis and a tilt angle $\theta_i$ of said image display means with respect to said visual axis satisfy the following condition:

$0.3 < \theta_1/\theta_i < 0.6$.

9. A visual display apparatus according to claim 5, 6, 7 or 8, further comprising means for positioning said image display means and ocular optical system with respect to an observer's head.

10. A visual display apparatus according to claim 9, further comprising means for supporting said image display means and ocular optical system with respect to the observer's head, thereby enabling said apparatus to be mounted on the observer's head.

11. A visual display apparatus according to claim 10, further comprising means for supporting at least a pair of said visual display apparatuses at a predetermined spacing.

12. A visual display apparatus comprising:

a face-mounted unit body having means for displaying an image, and an ocular optical system for projecting an image formed by said image display means and for leading the projected image to an observer's eyeball; and a support member for supporting said face-mounted unit body on an observer's head;

said image display means being disposed so that an extension of an optical axis exiting from said image display means obliquely intersects a straight extension of an optical axis exiting from said ocular optical system toward the observer's eyeball, said straight extension being defined as a visual axis; and said ocular optical system having a first surface which has a concave surface directed toward the observer's eyeball, and a second surface which is disposed more away from said observer's eyeball than said first surface, said second surface having a concave surface directed toward said observer's eyeball, said first and second surfaces being formed so that light rays emitted from said image display means are reflected by at least said first surface, and the reflected light rays are reflected by said second surface and then pass through said first surface to enter said observer's eyeball.

13. A visual display apparatus according to claim 12, wherein said image display means has a display surface which is disposed at a tilt to said visual axis so as to face said observer's eyeball such that the extension of the optical axis exiting from said image display means obliquely intersects said visual axis.

14. A visual display apparatus comprising:

a face-mounted unit body having means for displaying an image, and an ocular optical system for protecting an image formed by said image display means and for leading the projected image to an observer's eyeball; and a support member for supporting said face-mounted unit body on an observer's head;

said image display means being disposed so that an extension of an optical axis exiting from said image display means obliquely intersects a straight extension of an optical axis exiting from said ocular optical system toward the observer's eyeball, said straight extension being defined as a visual axis;

said ocular optical system having a first surface which has a concave surface directed toward the observer's eyeball, and a second surface which is disposed more away from said observer's eyeball than said first surfacer, said second surface having a concave surface directed toward said observer's eyeball, said first and second surfaces being formed so that light rays emitted from said image display means are reflected by at least said first surface, and the reflected light rays are reflected by said second surface and then pass through said first surface to enter said observer's eyeball; and said ocular optical system includes a prism having a medium member with a refractive index n larger than 1 (n>1) between said first surface and said second surface, so that light rays emitted from said image display means are reflected by at least said first surface, and the reflected light rays pass through said medium, are reflected by said second surface, repass through said medium, and pass through said first surface.

15. A visual display apparatus according to claim 12, 13 or 14, wherein a surface separation between said first surface and said second surface is narrower at said visual axis side than at said image display means side.

16. A visual display apparatus according to claim 15, wherein said ocular optical system has a lens with positive power between said first surface and said observer's eyeball.

17. A visual display apparatus according to claim 15, wherein said ocular optical system has a lens disposed at a side of said second surface which is remote from said observer's eyeball such that a thickness of said lens is larger at said visual axis side than at said image display means side.

18. A visual display apparatus according to claim 17, wherein said lens is cemented to said second surface.

19. A visual display apparatus according to claim 15, wherein both said first surface and said second surface are decentered with respect to said visual axis.

20. A visual display apparatus according to claim 13, wherein said image display means is at least 45° tilted with respect to said visual axis.

21. A visual display apparatus according to claim 13, wherein a tilt angle $\theta_1$ of said first surface with respect to said visual axis and a tilt angle $\theta_i$ of said image display means with respect to said visual axis satisfy the following condition:

$0.1 < \theta_1/\theta_i < 0.9$.

22. A visual display apparatus according to claim 13, wherein a tilt angle $\theta_1$ of said first surface with respect to said visual axis and a tilt angle $\theta_i$ of said image display means with respect to said visual axis satisfy the following condition:

$0.2 < \theta_1/\theta_i < 0.7$.

23. A visual display apparatus according to claim 13, wherein a tilt angle $\theta_1$ of said first surface with respect to said visual axis and a tilt angle $\theta_i$ of said image display means with respect to said visual axis satisfy the following condition:

$0.3 < \theta_1/\theta_i < 0.6$.

24. A visual display apparatus according to claims 12 or 13, wherein said ocular optical system satisfies the following condition:

the area where light beams pass through said first surface is deviated from the area where the light beams are reflected by said first surface.

25. A visual display apparatus according to claim 24, wherein the area where light beams pass through said first surface is deviated closer to said visual axis than the area where light beams are reflected by said first surface.

26. A visual display apparatus according to claims 12 or 13, wherein reflection on said first surface is performed on a convex side of said first surface, and reflection on said second surface is performed on a concave side of said second surface.

27. A visual display apparatus according to claim 26, wherein the convex side of said first surface comprises a medium having a refractive index (n) higher than 1, and the concave side of said second surface comprises a medium having a refractive index (n) higher than 1.

28. A visual display apparatus according to claim 27, wherein a configuration of said first surface with said concave surface directed toward the observer's eyeball is a cross-sectional configuration in an XZ-plane perpendicular to a YZ-plane containing an optical path formed by said light rays between said first surface and said second surface.

29. A visual display apparatus according to claim 28, wherein the cross-sectional configuration of said first surface in the YZ-plane is a curved surface.

30. A visual display apparatus according to claim 29, wherein the cross-sectional configuration of said first surface in the YZ-plane is a non-rotationally symmetric aspherical surface.

31. A visual display apparatus according to claim 30, wherein the cross-sectional configuration of said first surface in the YZ-plane and has a concave surface directed toward the observer's eyeball.

32. A visual display apparatus according to claim 29, wherein the cross-sectional configuration of said first surface in the YZ-plane has a concave surface directed toward the observer's eyeball.

33. A visual display apparatus according to claim 29, wherein the cross-sectional configuration of said first surface in the YZ-plane has a convex surface directed toward the observer's eyeball.

34. A visual display apparatus according to claim 12, 13 or 14, wherein a configuration of said first surface with said concave surface directed toward the observer's eyeball is a cross-sectional configuration in a YZ-plane containing an optical path formed by said light rays between said first surface and said second surface.

35. A visual display apparatus according to claim 12, 13 or 11, wherein a configuration of said first surface with said concave surface directed toward the observer's eyeball is a cross-sectional configuration in an XZ-plane perpendicular to a YZ-plane containing an optical path formed by said light rays between said first surface and said second surface.

36. A visual display apparatus according to claim 35, wherein the cross-sectional configuration of said first surface in the YZ-plane is a curved surface.

37. A visual display apparatus according to claim 36, wherein the cross-sectional configuration of said first surface in the YZ-plane is a curved surface.

38. A visual display apparatus according to claim 37, wherein the cross-sectional configuration of said first surface in the YZ-plane has a concave surface directed toward the observer's eyeball.

39. A visual display apparatus according to claim 36, wherein the cross-sectional configuration of said first surface in the YZ-plane and has a concave surface directed toward the observer's eyeball.

40. A visual display apparatus according to claim 36, wherein the cross-sectional configuration of said first surface in the YZ-plane has a convex surface directed toward the observer's eyeball.

* * * * *